(12) United States Patent
Hong et al.

(10) Patent No.: US 12,294,901 B2
(45) Date of Patent: *May 6, 2025

(54) METHOD FOR PERFORMING TERMINAL-BASED HANDOVER AND DEVICE THEREFOR

(71) Applicant: KT CORPORATION, Seongnam-si (KR)

(72) Inventors: Sung-pyo Hong, Seongnam-si (KR); Woo-jin Choi, Seongnam-si (KR)

(73) Assignee: KT CORPORATION, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,714

(22) Filed: Jan. 26, 2024

(65) Prior Publication Data

US 2024/0172066 A1 May 23, 2024

Related U.S. Application Data

(63) Continuation of application No. 16/605,402, filed as application No. PCT/KR2018/004383 on Apr. 16, 2018, now Pat. No. 11,937,136.

(30) Foreign Application Priority Data

Apr. 20, 2017 (KR) .......................... 10-2017-0051212
Apr. 20, 2017 (KR) .......................... 10-2017-0051258
Apr. 13, 2018 (KR) .......................... 10-2018-0043161

(51) Int. Cl.
*H04W 36/00* (2009.01)
*H04W 36/08* (2009.01)
*H04W 36/36* (2009.01)

(52) U.S. Cl.
CPC . *H04W 36/00837* (2018.08); *H04W 36/0061* (2013.01); *H04W 36/0085* (2018.08); *H04W 36/08* (2013.01); *H04W 36/36* (2013.01)

(58) Field of Classification Search
None
See application file for complete search history.

(56) References Cited

U.S. PATENT DOCUMENTS

| | | | |
|---|---|---|---|
| 2012/0157101 A1* | 6/2012 | Uemura | H04W 36/0061 455/436 |
| 2014/0328327 A1* | 11/2014 | Xiao | H04L 5/0073 370/332 |
| 2016/0302118 A1* | 10/2016 | Yiu | H04W 48/16 |
| 2017/0201306 A1* | 7/2017 | Shimezawa | H04B 7/0626 |
| 2018/0098258 A1* | 4/2018 | Annam | H04W 4/02 |
| 2018/0279193 A1* | 9/2018 | Park | H04W 36/26 |
| 2019/0281511 A1* | 9/2019 | Susitaival | H04W 36/0061 |

* cited by examiner

*Primary Examiner* — Charles N Appiah
*Assistant Examiner* — Frank E Donado
(74) *Attorney, Agent, or Firm* — INVENSTONE PATENT, LLC

(57) ABSTRACT

Provided are a method and a device for performing a UE-based handover in a next generation wireless access network. The method of a UE may include receiving, from a source base station, an upper layer signaling including information on UE-based handover command and information on conditions for handover execution; storing a target cell configuration by using the information on conditions for handover execution; and determining whether to perform a handover procedure to a target cell, by determining whether predetermined conditions for handover are satisfied.

19 Claims, 10 Drawing Sheets

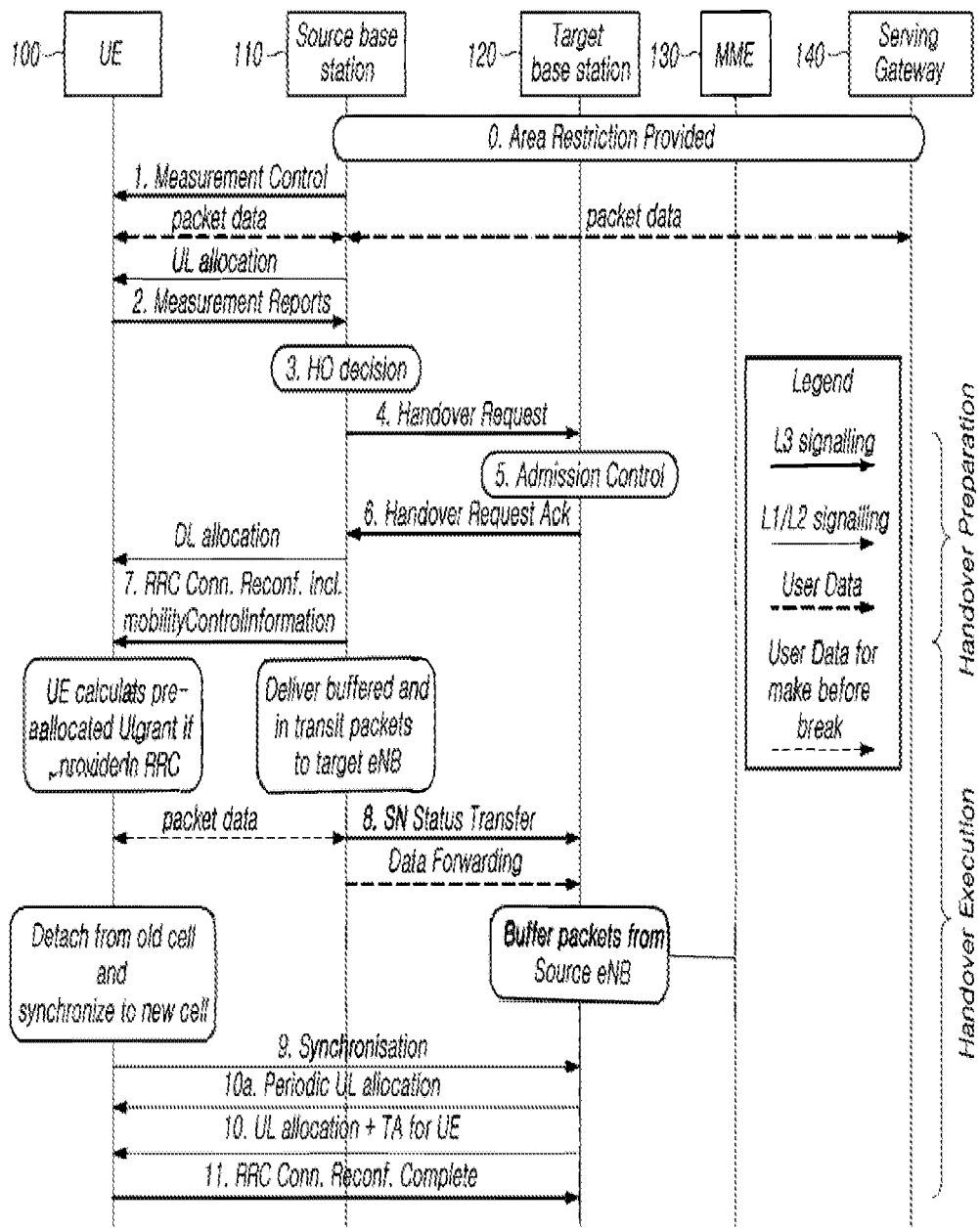

FIG.2

*ReportConfigEUTRA* Information element

```
-- ASN1START

ReportConfigEUTRA ::=         SEQUENCE {
    triggerType                   CHOICE {
        event                         SEQUENCE {
            eventId                       CHOICE {
                eventA1                       SEQUENCE {
                    a1-Threshold                  ThresholdEUTRA
                },
                eventA2                       SEQUENCE {
                    a2-Threshold                  ThresholdEUTRA
                },
                eventA3                       SEQUENCE {
                    a3-Offset                     INTEGER (-30..30),
                    reportOnLeave                 BOOLEAN
                },
                ..., periodical                    SEQUENCE {
            purpose                       ENUMERATED {
                                              reportStrongestCells, reportCGI}
        }
    },
```

METHOD FOR PERFORMING TERMINAL-BASED HANDOVER AND DEVICE THEREFOR

CROSS-REFERENCE TO RELATED APPLICATIONS

This application is a continuation application of U.S. patent application Ser. No. 16/605,402, filed on Oct. 15, 2019, which is the National Stage filing under 35 U.S.S. 371 of International Application No. PCT/KR2018/004383, filed on Apr. 16, 2018, which claims the benefit of priority to Korean Patent Application No. 10-2017-0051258, filed on Apr. 20, 2017, Patent Application No. 10-2017-0051212, filed on Apr. 20, 2017, and Patent Application No. 10-2018-0043161, filed on Apr. 13, 2018 in the Korean Intellectual Property Office.

TECHNICAL FIELD

The present disclosure relates to methods and devices for performing a terminal-based handover (e.g., UE-based handover) in a next generation radio access network.

BACKGROUND ART

There have been many studies on next generation mobile communication technologies for processing a large amount of data at a high-speed. For example, mobile communication systems have been developed by employing technologies related to the 3rd generation partnership project (3GPP), such as Long Term Evolution (LTE), LTE-Advanced, 5G, or the like. Such mobile communication systems are high-speed and large-capacity communication systems capable of transmitting and receiving a large amount of various data, such as video data, radio data, or the like, at a high speed.

Lately, a 5G network is introduced. Accordingly, it is essential to provide mobility between 5G base stations. In particular, in case a 5G base station uses an mmWave frequency of a high-frequency band (e.g., 28 GHz), it is expected that the coverage of the base station will be further reduced due to the characteristics of the frequency. In such a situation, it is also expected that a terminal (hereinafter, referred to as "user equipment" (UE)) may move more frequently between base stations. Therefore, it is very important to provide an effective handover procedure to address such an issue.

Accordingly, due to frequent handovers and propagation characteristics of the high-frequency band, it may be difficult to maintain communication connection between a UE and a base station during handover procedure. For example, the communication connection between the base station and the UE may be disconnected in a handover procedure, when the UE moves out of coverage of the base station, when a communication environment suddenly changes, or the like. Therefore, it may be difficult to perform seamless communication with the UE.

Accordingly, there is a need for a technology for performing the handover seamlessly and rapidly in the 5G network.

SUMMARY OF THE DISCLOSURE

To address such issues, in accordance with embodiments of the present disclosure, methods and devices are provided for enabling a UE to determine whether to perform a handover procedure based on information received from a base station, rather than enabling the base station.

In accordance with one aspect of the present disclosure, a method of a UE is provided of performing a UE based handover. The method may include: receiving high layer signaling including UE based handover command information and handover execution condition information for executing the UE based handover command from a source base station, storing a target cell configuration using the handover execution condition information, and determining whether to hand over to a target cell by evaluating whether the handover execution condition is met.

In accordance with another aspect of the present disclosure, a method of a source base station is provided of controlling the execution of a UE based handover. The method may include: configuring handover execution condition information for executing a UE based handover command, transmitting first high layer signaling including the handover execution condition information and UE based handover command information to a UE, and when the handover execution condition information is changed, transmitting, to the UE, second high layer signaling including changed handover execution condition information and UE based handover command information.

In accordance with further another aspect of the present disclosure, a UE is provided of performing a UE based handover. The UE may include: a receiver receiving high layer signaling including UE based handover command information and handover execution condition information for executing the UE based handover command from a source base station, and a controller storing a target cell configuration using the handover execution condition information and determining whether to hand over to a target cell by evaluating whether the handover execution condition is met.

In accordance with yet another aspect of the present disclosure, a source base station is provided of controlling the execution of a UE based handover. The source base station may include: a controller configuring handover execution condition information for executing a UE based handover command, and a transmitter transmitting first high layer signaling including the handover execution condition information and UE based handover command information to a UE and, when the handover execution condition information is changed, transmitting, to the UE, second high layer signaling including changed handover execution condition information and UE based handover command information.

In accordance with embodiments of the present disclosure, a UE is enabled to effectively perform a handover procedure rapidly in the 5G network environment.

Further, in accordance with embodiments of the present disclosure, the handover procedure is performed after the UE determines whether to perform the handover. Accordingly, it is possible to provide a seamless communication service to users through a stable and rapid handover process.

BRIEF DESCRIPTION OF THE DRAWINGS

FIGS. 1A and 1B are diagrams illustrating a handover procedure in the LTE network.

FIG. 2 is a diagram illustrating an example of measurement configuration information according to at least one embodiment of the present disclosure.

DETAILED DESCRIPTION OF THE DISCLOSURE

Figure 1B:
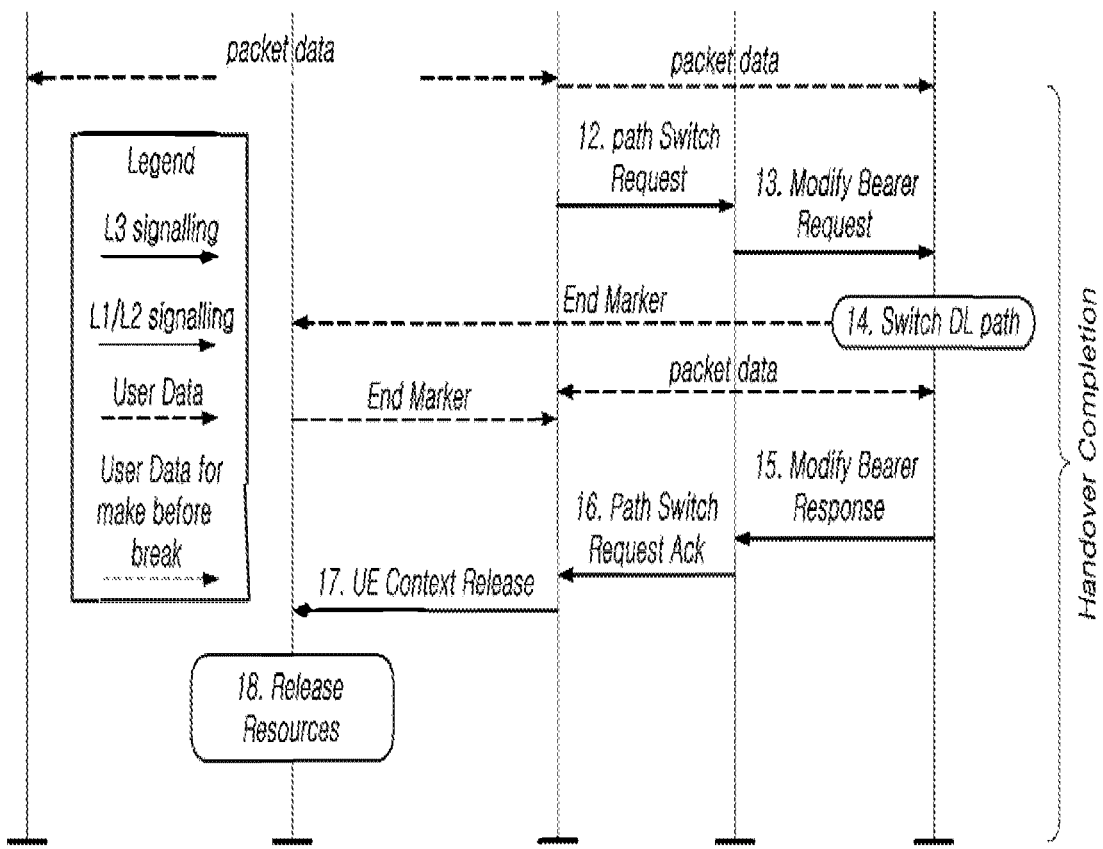

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a machine type communication (MTC) terminal may refer to a terminal supporting low cost (or low complexity), a terminal supporting coverage enhancement, or the like. The MTC terminal may refer to a terminal supporting low cost (or low complexity), a terminal supporting coverage enhancement, and the like. The MTC terminal may refer to a terminal classified into a predetermined category for supporting low cost (or low complexity) and/or coverage enhancement.

In other words, the MTC terminal herein may refer to a low cost (or low complexity) user equipment category/type newly defined in 3GPP Release-13 and performing LTE-based MTC-related operations. The MTC terminal may refer to a user equipment category/type defined in or before 3GPP Release-12, which supports enhanced coverage in comparison with the typical LTE coverage or supports low power consumption. Or, the MTC device may refer to a low cost (or low complexity) user equipment category/type newly defined in Release-13.

In the present disclosure, a wireless communication system is widely deployed to provide various communication services, such as a voice communication service, a packet data service, etc. The wireless communication system includes a user equipment (hereinafter, referred to as "UE") and a base station (BS, or eNB). In the present disclosure, the UE is defined as a generic term referring to terminals used in wireless communications. For example, the UE may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally refers to a station communicating with the UE. The base station or the cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

That is, the base station or the cell is defined as a generic term including, but not limited to, as well as some areas or functions covered by a base station controller (BSC) in CDMA, a Node-B in the WCDMA, an evolved Node-B (eNB) or a sector (site) in the LTE, and the like, all of various coverage areas, such as a megacell, a macrocell, a microcell, a picocell, a femtocell and a relay node, RRH, RU, a small cell communication range, or the like.

Each of the various cells is controlled by a base station. Therefore, the base station may be classified into two categories. The base station may be referred to 1) an apparatus that forms a corresponding communication service area, such as a megacell, a macrocell, a microcell, a picocell, a femtocell, or a small cell, and provide a related service to the corresponding communication service area or 2) a communication service area. In the case of 1), the base station may be referred to i) apparatuses controlled by the same entity to form a corresponding communication service area and provide a related service within the corresponding communication service area or ii) apparatuses interacting and cooperating with each other for forming the corresponding communication service area and providing a related service within the corresponding communication service area. According to communication schemes employed by a base station, the base station may be referred to as an eNB, a RRH, an antenna, a RU, a low power node (LPN), a point, a transmission/reception point, a transmission point, a reception point, or the like. In the case of 2), the base station may be a communication service area itself where UEs able to receive signals from or transmit signals to other UEs and neighboring base stations.

Accordingly, the base station is defined as a generic term collectively including the megacell, the macrocell, the microcell, the picocell, the femtocell, or the small cell, the RRH, the antenna, the RU, the LPN, the point, the eNB, the transmission/reception point, the transmission point, or the reception point.

In the present disclosure, the UE and the base station are two entities for performing transmission/reception used to embody the technology and technical spirit described in the present specification. The UE and the base station are defined as a generic term and not limited to specific terms or words. The UE and the base station are two entities for performing uplink or downlink transmission/reception used to embody the technology and technical spirit described in the present disclosure. The UE and the base station are defined as a generic term and not limited to specific terms or words. Herein, the uplink (hereinafter, referred to as "UL") refers to data transmission/reception by a UE to/from a base station, and the downlink (hereinafter, referred to as "DL") refers to data transmission/reception by a base station to/from a UE.

Any of multiple access techniques may be applied to the wireless communication system. For example, the wireless communication system may employ various multiple access techniques, such as code division multiple access (CDMA), time division multiple access (TDMA), frequency division multiple access (FDMA), orthogonal frequency division multiple access (OFDMA), OFDM-TDMA, OFDM-FDMA, OFDM-CDMA, or the like. An embodiment of the present disclosure may be applied to resource allocation in as well as asynchronous wireless communication evolving into LTE/LTE-advanced and IMT-2020 beyond GSM, WCDMA, and HSPA, synchronous wireless communication evolving into CDMA, CDMA-2000, and UMB. The present disclosure is not construed to be limited to or limited to a particular wireless communication field and is construed as including all technical fields to which the spirit of the present disclosure may be applied.

UL transmission and DL transmission may be performed based on i) a time division duplex (TDD) technique performing transmission through different time slots or ii) a frequency division duplex (FDD) technique performing transmission through different frequencies.

Further, under the related standard, in some systems such as the LTE system or the LTE-advanced system, the UL and the DL are configured based on a single carrier or a pair of carriers. For transmitting/receiving control information, the UL and the DL may be configured with one or more control channels, such as a physical DL control channel (PDCCH), a physical control format indicator channel (PCFICH), a physical hybrid ARQ indicator channel (PITCH), a physical UP control channel (PUCCH), an enhanced physical DL control channel (EPDCCH), or the like. For transmitting/receiving data, the UL and the DL may be configured with one or more data channels, such as a physical DL shared channel (PDSCH), a physical UL shared channel (PUSCH), or the like.

Meanwhile, the control information may be transmitted through the EPDCCH (enhanced PDCCH or extended PDCCH).

In the present disclosure, the cell may refer to a coverage of a signal transmitted from a transmission point or a transmission/reception point, a component carrier having the coverage of the signal transmitted from the transmission point or the transmission/reception point, or the transmission/reception point itself.

A wireless communication system to which at least one embodiment is applied may be i) a coordinated multi-point transmission/reception system (CoMP system) in which two or more transmission/reception points cooperate to transmit a signal, ii) a coordinated multi-antenna transmission system, or iii) a coordinated multi-cell communication system. The CoMP system may include at least two multiple transmission/reception points and UEs.

The multiple transmission/reception points may be a base station or macrocell (hereinafter, referred to as 'eNB') and at least one remote radio head (RRH) that is connected to the eNB through an optical cable or an optical fiber and thereby controlled in a wired manner, and that has high transmission power or low transmission power in the macrocell area.

Hereinafter, the DL denotes communication or a communication path from multiple transmission/reception points to a UE, or the UL denotes communication or a communication path from the UE to the multiple transmission/reception points. In the DL, a transmitter may be a part of multiple transmission/reception points and a receiver may be a part of the UE. In the UL, a transmitter may be a part of the UE and a receiver may be a part of multiple transmission/reception points.

Hereinafter, transmission/reception of a signal through a channel such as the PUCCH, the PUSCH, the PDCCH, or the PDSCH, may be described as transmission/reception of the channel, such as the PUCCH, the PUSCH, the PDCCH, or the PDSCH.

In addition, hereinafter, a description of transmitting or receiving a PDCCH or a description of transmitting or receiving a signal through the PDCCH may be used as meaning including transmitting or receiving an EPDCCH or transmitting or receiving a signal through the EPDCCH.

That is, a physical DL control channel described below may mean the PDCCH or the EPDCCH, or is also used as meaning including both the PDCCH and the EPDCCH.

Also, for convenience of description and ease of understanding, an EPDCCH may be applied to an embodiment described with the PDCCH, as an embodiment of the present disclosure, and the PDCCH may be also applied to an embodiment described with the EPDCCH as an embodiment.

Meanwhile, higher layer signaling described below includes radio resource control (RRC) signaling transmitting RRC information containing an RRC parameter.

The eNB performs DL transmission to UEs. The eNB may transmit a physical DL shared channel (PDSCH) which is a primary physical channel for unicast transmission, and a physical DL control channel (PDCCH) for transmitting i) DL control information such as scheduling required to receive the PDSCH and ii) scheduling approval information for transmission through an UL data channel (for example, a physical UL shared channel (PUSCH)). Hereinafter, transmitting/receiving a signal through each channel may be described in such a manner that a corresponding channel is transmitted/received.

An enhanced mobile broadband (eMBB), massive machine-type communication (mMTC), and ultra-reliable and low latency communication (URLLC) are proposed as representative usage scenarios for NR having been discussed in the 3GPP recently.

In the present disclosure, a frequency, a frame, a sub-frame, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

For example, in the present disclosure, the LTE and the NR denote different radio access technologies. The term "NR" as used herein refers to a new radio access technology under discussion in Release-15 of the 3GPP. The NR may include various differences compared with the LTE, such as a different frame structure, channel, core network technology, or the like. The NR may additionally include wireless transmission in a high band, transmission of a large volume of data or transmission of data in high speed.

Hereinafter, for convenience of description and ease of understanding, typical radio access technologies are referred to as the LTE, and the new radio access technology under discussion in the 3GPP is referred to as the NR. A base station may be an eNB employing the LTE technology or a gNB employing the NR technology, and one of the eNB and the gNB will be used, when needed.

A cell is used as a generic term including, but not limited to, a radio path, a radio link, a carrier, or the like, for transmitting data, and one base station may transmit/receive data using a plurality of cells. A UE may transmit/receive data using multiple cells, respective cells of which are controlled by two base stations. As described below, in describing carrier aggregation and dual connectivity, a case where a plurality of cells controlled by one base station is used may be discussed using the carrier aggregation, and a case where a plurality of cells controlled by two or more base stations is used may be discussed using dual connectivity.

Embodiments of the present disclosure may be applied to any radio access (e.g., the LTE) networks and UEs, as well as next generation mobile communication (for example, 5G mobile communication/NR) UEs.

Hereinafter, for convenience of description, the base station may denote an eNode-B of LTE/E-UTRAN or an LTE base station. The base station may denote i) an NR node, ii) a central unit (CU) and a distribute unit (DU) in the 5G radio network, iii) a gNodeB, or iv) an NR base station in which the CU and the DU form one logical entity. The base station may also be used as a generic term including the LTE base station and the NR base station.

Hereinafter, with respect to the base station, discussions are conducted by focusing on a base station employing the next generation mobile communication technology (5G); however, the present disclosure can also be applied to in a case where one of a source base station and a target base station is a gNB, and the other is an eNB. That is, the base station herein may be a gNB or an eNB, and there is no limitation to a specific base station. It should be noted that hereinafter, for the purpose of unity of description, discussions are conducted by focusing on a 5G environment in which the next generation mobile communication technology (5G) is implemented; however, the present disclosure may also be equally applied to mobile communication technologies in the 4G or after the 5G.

Further, the term "UE based handover" (e.g., terminal based handover) as described herein is used for referring to a handover scheme in which a UE determines whether to perform a handover; however, embodiments of the present disclosure are not limited to a specific term. That is, it should be understood that the UE based handover includes a conditional handover indicating a handover scheme in which a UE determines whether to execute a handover, an autonomous handover of a UE, a UE handover based on the control of a base station, a faster handover command instruction, a handover indicating a handover execution rule/condition/threshold, or the like. Further, the handover is instructed to a UE through an RRC connection reconfiguration message with mobility information (mobilityControlInformation). The mobility information includes information for synchronization with a target cell (or a target base station). Accordingly, a reconfiguration procedure including a handover command message may be used as an equal meaning to a reconfiguration procedure including synchronization information. Accordingly, the term of the UE based handover (e.g., terminal based handover) may be replaced by various terms when needed.

In the LTE technology, a handover for supporting the mobility of a UE in an RRC connected mode is provided based a network control basis. A target base station prepares a handover according to a handover request message from a source base station. For executing the handover, the target base station generates an RRC message to be transferred to a UE, that is, an RRCConnectionReconfiguration message including the mobilityControlInformation. The target base station transmits a handover request acknowledgment message to the source base station.

The handover request acknowledgment message includes a container carrying an RRC message to be transferred to a UE. The container includes a new C-RNTI, a target eNB security algorithm identifier, a dedicated RACH preamble, target eNB SIB s and one or more other parameters. The RRC message is an RRC reconfiguration message including the mobilityControlInfo. Such an RRC message is generated by the target base station and then transferred to the UE via the source base station. The source base station performs integrity protection and ciphering only needed for safely transmitting the RRC message.

When the UE receives the RRCConnectionReconfiguration message including the mobilityControlInformation, the UE performs synchronization with the target base station. Then, the UE accesses a target cell through a random access channel (RACH).

The UE induces a target base station specific key (target eNB specific key) and configures a selected security algorithm to be used in the target cell.

The UE initiates synchronization to DL of the target PCell.

The UE resets master cell group (MCG) MAC and secondary cell group (SCG) MAC, if configured.

The UE re-establishes packet data convergence protocol (PDCP) for all established radio bearers (RBs).

The UE re-establishes MCG radio link control (RLC) and SCG RLC, if configured, for all established radio bearers (RBs).

The UE configures lower layers to consider SCell(s), if configured, to be deactivated.

The UE applies a value of a new UE identifier (newUE-Identity) with a C-RNTI.

The UE submits, to lower layers, an RRC connection reconfiguration complete message for transmission to the target base station.

The target base station (eNB) responds with UL allocation and timing advance.

When the UE successfully accesses the target cell, for confirming the handover, the UE transmits an RRCConnectionReconfigurationComplete message (using the C-RNTI) for indicating that the handover for the UE has been completed to the target base station, along with an UL buffer status report (BSR). The target base station verifies the C-RNTI included in the RRCConnectionReconfigurationComplete message.

The target base station starts to send data.

The network based handover procedure has been performed through such a procedure. More specifically, the handover in the LTE technology is described with reference to FIGS. 1A and 1B.

FIGS. 1A and 1B are diagrams illustrating a handover procedure in the LTE network.

Referring to FIGS. 1A and 1B, at step 0, a source base station 110 provides an area restrictive service through a serving gateway 140. At step 1, the source base station 110 transmits measurement control information for measurement reporting to a UE 100. The UE 100 connected to the source base station 110 transmits packet data to a serving gateway through the source base station 110, and the UE 100 receives packet data through the identical path. For enabling the UE 100 to transmit UL data, the source base station 110 allocates an UL resource to the UE 100.

At step 2, the UE 100 transmits a measurement report including a measurement result according to a measurement reporting trigger to the source base station 110. Thereafter, at step 3, the source base station 110 determines a handover of the UE 100 based on the measurement report.

When the handover of the UE 100 is determined, at step 4, the source base station 110 transmits a handover request message for enabling the UE to prepare the handover to a target base station 120. At step 5, the target base station 120 determines whether to admit a requested resource, and the target base station 120 generates configuration information to be transmitted to the UE. At step 6, the target base station 120 transmits a handover request acknowledgment message including configuration information to be configured in the UE 100, which is contained in a container, to the source base station 110. This container is a transparent container transferred to the UE as an RRC connection reconfiguration message for enabling the UE to perform the handover. For example, the transparent container may be set such that an intermediate entity forwards the container without changing the contents of the container.

To transmit the configuration information for the handover to the UE 100, the source base station 110 allocates a DL resource to the UE and transmits, to the UE, the RRC connection reconfiguration message, which is the container received from the target base station 120, at step 7

The UE 100 calculates a pre-allocated UL resource and the source base station 110 buffers packets to be transferred to the target base station 120.

In the process of the handover, the UE 100 and the source base station 110 transmits and receives packet data, and the source base station 110 transmits a SN statue transfer message to the target base station 120 at step 8. The source base station 110 forwards the data to the target base station 120.

The UE 100 performs a synchronization procedure to synchronize to a cell of the target base station 120 at step 9. The target base station 120 buffers the data forwarded from the source base station 110.

At step 10a, the target base station 120 may allocate periodic UL resources to the UE, and provide UL resource allocation and TA for the UE 100 at step 10. Through these procedures, after the UE 100 has synchronized to the target base station 120, accessed the target base station through a random access procedure, and completed the handover, the UE transmits an RRC connection reconfiguration complete message to the target base station 120 at step 11. Thereafter, the UE 100 transmits and receives packet data to a serving gateway 140 via the target base station 120.

At steps 12 and 13, the target base station 120 requests data path switch to an MME 130, and the MME 130 transmits a bearer modification request message to the serving gateway 140. At step 14, the serving gateway 140 switches a DL data path. To do this, a target marker maybe transferred to the target base station 120 via the source base station 110. Packet data maybe transmitted and received between the serving gateway 140 and the target base station 120.

When the bearer modification is completed, the serving gateway 140 transmits a bearer modification complete message to the MME 130 at step 15. At step 16, the MME 130 transmits an acknowledgment message notifying that the data path switch request has been completed to the target base station 120.

Thereafter, at step 17, the target base station 120 indicates UE context release to the source base station 110. Finally, at step 18, the source base station 110 releases the UE context, and then the handover procedure is completed.

Like this, the network control based handover is performed well in the typical radio environment as a basic handover method. However, in case radio quality of a serving cell is changed suddenly, there has been a possibility that a handover may fail as a UE does not receive a handover command or receives it too late. In particular, radio link quality may be degraded faster in an NR (5G) radio network employing a high frequency band and a beam-based system. In this case, as the UE moves beyond a current serving beam coverage area, there has been a possibility that the UE may not receive RRC signaling via a serving node.

To address such issues, in accordance with embodiments of the present disclosure, a UE based handover is provided, in which a UE directly determines whether to perform a handover procedure and perform the handover procedure based on the determination.

Further, in the procedure of the UE based handover, when the target base station allocates a resource (a RACH preamble, a C-RNTI, or the like) for a corresponding UE and includes the allocated resources in a handover command, the radio resources cannot be used or released efficiently. In addition to this, the UE based handover may use a threshold value lower than a typical threshold value for instructing measurement configuration in order to provide related configuration information to the UE faster. As an alternative, to execute efficiently the UE based handover, the UE based handover may be configured for one or more candidate cells. To do this, more number of measurement configurations may be instructed Like this, the UE based handover may generate more measure reports than the typical handover because of a comparatively lower threshold value. As a result, signaling overhead may increase.

Accordingly, proposed herein is a UE based handover procedure for effectively utilizing resources of a target base station and preventing signaling overhead.

As described above, embodiments will be discussed by focusing on a handover of an NR radio new radio, but may be applicable to a handover in any other radio network or system, as well as the LTE. Further, embodiments may be applicable to a handover between an NR radio network and an LTE network connected to a 5G core network system, and be applicable to a handover between an NR radio network and an LTE network connected to an EPC Similarly, the embodiments may be applicable to a handover between an NR radio network and an LTE network connected to respective core networks.

A base station may instruct measurement configuration to an RRC connected UE equally in both the network based handover and the UE based handover. A physical layer in the UE performs measurement and then transfers the measured data to an RRC layer. The physical layer may perform L1 filtering. When the measured data is transferred from the physical layer, the RRC layer performs L3 filtering according to the measurement configuration. After the L3 filtering, the filtered data are used for evaluating a reporting criterion. The reporting criterion according to the measurement configuration is used to determine whether to trigger reporting.

When the reporting is triggered, the UE reports the measured result according to the measurement configuration to the base station.

FIG. 2 is a diagram illustrating an example of measurement configuration information according to at least one embodiment of the present disclosure.

Referring to FIG. 2, a measurement configuration using an RRC message may include the following parameters.

A measurement object is defined as an object measured by a UE, such as a frequency or a cell. In the LTE, a single measurement object is configured for a given frequency. With respect to heterogeneous RAT measurement, a measurement object for the UTRA is configured with a set of cells for a single frequency. A measurement object for the GERAN is configured with a set of carrier frequencies.

A reporting configuration indicates a reporting criterion and a reporting format. The reporting criterion (trigger type) denotes a criterion for triggering a UE to transmit a measurement report, and the reporting format denotes measurement quantities included in the measurement report. The reporting may be triggered periodically or triggered based on a predetermined event. In addition to this, the UE may transmit periodic reports to a base station based on the predetermined event after the reporting has been triggered. This may be configured through a number and an interval of the measurement reports in the reporting configuration.

Thus, for the UE based handover, the UE is required to perform measurement operation for measuring the quality of a radio network. To do this, a base station may provide a measurement configuration to the UE.

Hereinafter, operations of a UE and a base station performing the UE based handover will be discussed with reference to the accompanying drawings.

Figure 3:
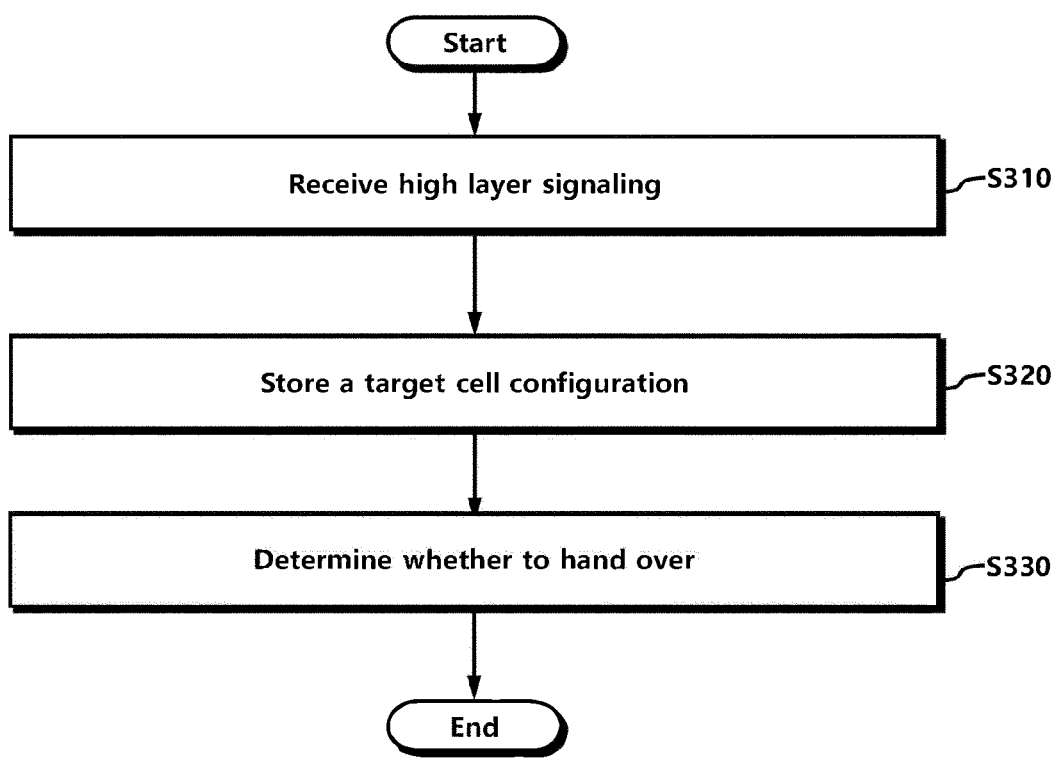
FIG. 3 is a flow diagram illustrating operations of a UE according to one embodiment of the present disclosure.

FIG. 3 is a flow diagram illustrating operation of a UE according to embodiments of the present disclosure.

Referring to FIG. 3, a UE may receive high layer signaling including UE based handover command information and handover execution condition information for executing the UE based handover from a source base station, at step S310.

For example, the UE may receive execution condition information including handover command information and condition information for executing the handover from a source base station having an RRC connection with the UE. For example, the handover execution condition information and the handover command information may be included in an RRC connection reconfiguration message.

The handover execution condition information may be configured by a target base station and then transferred to the source base station. As another example, the handover execution condition information may be configured by the source base station. As a further another example, the handover execution condition information may be configured by the target base station and then transferred to the UE via the source base station. As a yet another example, the handover execution condition information may be configured by the source base station and transferred to the target base station, and then, the target base station may transfer it to the UE via the source base station. For example, the handover execution condition information may include a timer for indicating a validity period of the handover command or handover execution condition information. As an example, when the timer expires, the handover command or handover execution condition information may be considered as invalid.

In addition, the handover execution condition information may include information, parameters, timers and the like, needed for performing various embodiments or examples described below. As an example, the handover execution condition information may include at least one of parameter information for channel quality measurement needed for performing the UE based handover, trigger condition information for reporting a measured result, a timer for restricting or suppressing measurement reporting, a timer for indicating the validity period, indication information indicating a UE based handover command and UE configuration information for accessing a target base station. As an example, the UE configuration information may include a C-RNTI applied in a target base station, a target base station security algorithm identifier, a target base station dedicated RACH preamble, target base station SIB information, and the like. As another example, the parameter information for the channel quality measurement may include, as measurement object information, frequency information, reference signal configuration information, threshold value information, frequency offset information, cell list information, and a measurement identifier. As a further another example, the trigger condition information for reporting a measured result may include a condition/rule/event threshold value, and condition/rule/event offset information.

The handover execution condition information or the handover command information may be configured for each of a plurality of target base stations or a plurality of target cells. That is, the high layer signaling may include a plurality of handover execution condition information or handover command information, each of which may be included in a container for each identifier or for each target cell or target base station. The corresponding identifier may be associated with information on a measurement object, a measurement identifier, or a target cell identifier, included in a measurement configuration.

Thereafter, the UE may store a target cell configuration using the handover execution condition information, at step S320. For example, when UE based handover command information and handover execution condition information are received, the UE verifies whether the UE based handover has been instructed and store the target cell configuration according to the handover execution condition information.

For example, the UE stores a measurement configuration for measuring channel quality of the target cell according to the handover execution condition information and stores a trigger event, a trigger condition, or the like applied to the target cell.

As another example, when UE configuration information included in the handover execution condition information is stored and a handover to a target base station is determined, the UE is allowed to access rapidly the target base station without separately receiving a configuration of the target base station.

Meanwhile, as described above, when the handover execution condition information includes a timer for indicating a validity period (or restricting the applying of the validity period) of handover command information or handover execution condition information, the UE verifies whether the timer expires. When the timer expires, the UE releases the stored target cell configuration. Through this, it is possible to prevent resources from wasting, which is caused by continually occupying UE configuration information allocated or to be allocated by the target base station for the UE.

The UE may evaluate whether the handover execution condition information is met and determine whether to hand over to the target cell, at step S330. For example, the UE monitors channel quality of the target cell based on the stored target cell configuration and determine whether to perform the handover using the monitored result without a separate indication by the source base station.

For example, when a trigger condition included in the handover execution condition information is met, the UE determines handover execution to the target base station controlling the corresponding target cell.

As another example, the UE may not report a measurement result for the target base station to the source base station when the handover execution is determined. That is, when the UE based handover is configured, the UE controls a measurement result meeting a handover execution condition not to be transmitted to the source base station. As an alternative, when the UE based handover is configured, the UE controls measurement reporting not to be transmitted to the source base station until the timer of the validity period expires. In the situation that the source base station has instructed the handover command, this provides an effect of reducing one or more related procedure(s) or the entire load of the system caused by unnecessary measurement reporting repetition.

When handover execution is triggered to the target base station, the UE performs a random access procedure and access the target base station using the UE configuration information described above. Thus, since separate indication information from the source base station is not needed to be received, it is possible to prevent the handover from being interrupted even when the radio environment is changed suddenly.

Figure 4:
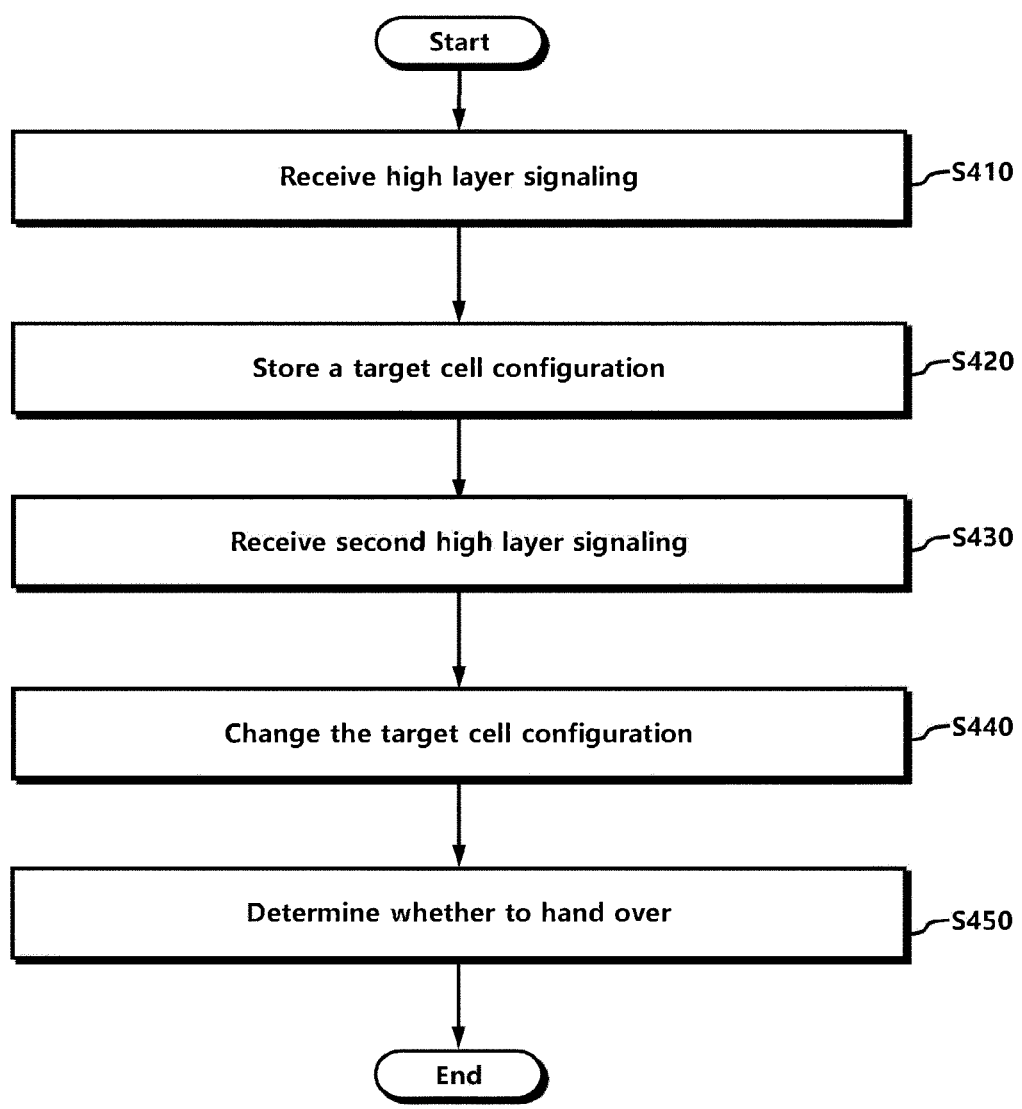
FIG. 4 is a flow diagram illustrating operations of the UE according to another embodiment of the present disclosure.

FIG. 4 is a flow diagram illustrating operations of the UE according to another embodiment of the present disclosure.

Referring to FIG. 4, as discussed with reference to FIG. 3, the UE may receive high layer signaling including UE based handover command information and handover execution condition information, at step S410. The operation of step 410 is similar to the operation of step S310.

Thereafter, the UE may store a target cell configuration received at step S410, at step S420. The operation of step 420 is similar to the operation of step S320.

After the UE has stored the target cell configuration, a source base station may change a UE based handover of the UE, or change a target cell or a target base station.

In this case, after the high layer signaling including the UE based handover command information has been received, in case the UE does not change the target cell or the target base station and maintains the connection with the source base station, due to not meeting a UE based handover criterion, the UE may receive second high layer signaling including other UE based handover command information, at step S430. For example, through a message identical to the high layer signaling received at step S410, the UE may receive handover command information or handover execution condition information different from the handover command information or the handover execution condition information at step S410. Herein, the second high layer signaling is used to distinguish from the high layer signaling at step S410, which may be referred to as first high layer signaling.

When the second high layer signaling is received, the UE may change the stored target cell configuration to a second target cell configuration configured using handover execution condition information included in the second high layer signaling, at step S440. For example, the UE may replace the target cell configuration stored at step S420 with the information included in the second high layer signaling. Herein, the second target cell configuration is used to distinguish from the target cell configuration at step S420, which may be referred to as a first target cell configuration.

The second target cell configuration may include UE configuration information of a target base station as described above. When the source base station changes the target cell or the target base station, the first target cell configuration is released or deleted, and the second target cell configuration may be newly stored.

As an alternative, when handover command or handover execution condition information included in the second high layer signaling indicates a handover scheme defined in the LTE other than the UE based handover, the first target cell configuration is deleted, and the handover defined in the LTE may be executed. That is, when the UE based handover is canceled, the UE may delete or replace the first target cell configuration for executing handover operations according to the typical scheme.

When the first target cell configuration is changed while maintaining the UE based handover, the UE may determine whether to execute the handover using the second target cell configuration, at step S450. When handover execution is determined because the received handover execution condition is satisfied, the UE may perform a procedure of accessing the changed target base station.

Through this, the source base station dynamically may change or control the UE based handover.

The operations of the UE described above will be discussed again with respective to a source base station.

Figure 5:
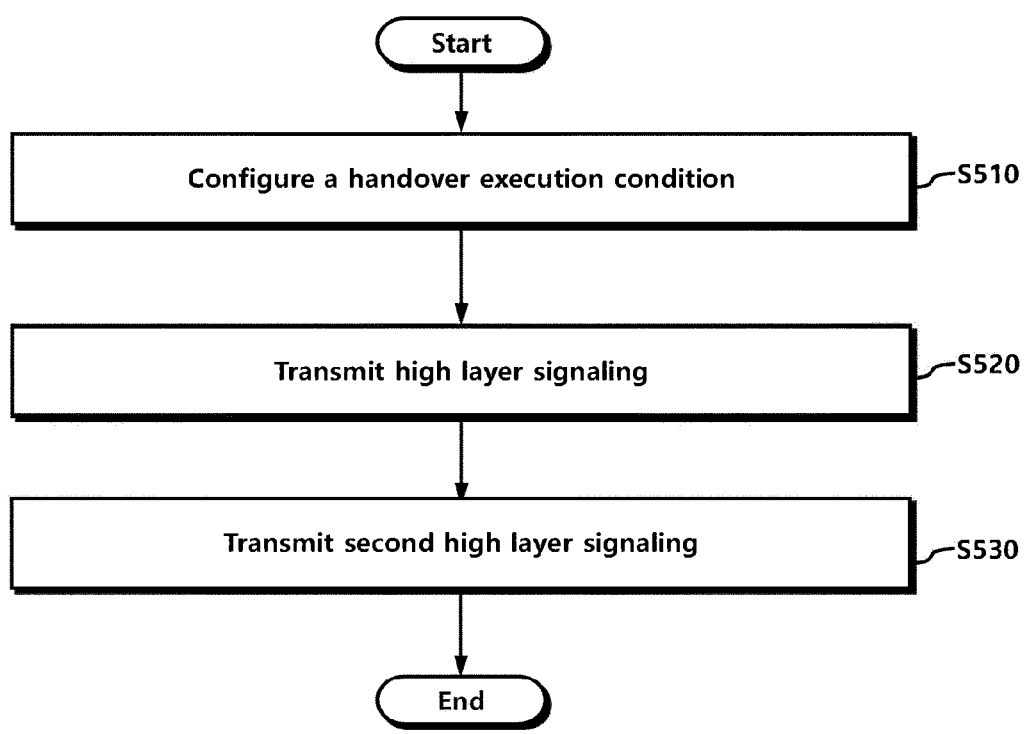
FIG. 5 is a flow diagram illustrating operations of a source base station according to at least one embodiment of the present disclosure.

FIG. 5 is a flow diagram illustrating operations of a source base station according to at least one embodiment of the present disclosure.

Referring to FIG. 5, the source base station may configure (e.g., generate) handover execution condition information for performing a UE based handover command, at step S510.

For example, the handover execution condition information may be configured by the source base station or be configured by the source base station after the source base station has received information from a target base station. As an alternative, the source base station receives information to be included in the handover execution condition information from a target base station and then generates the handover execution condition information to be transmitted to the UE.

For example, the handover execution condition information may include a timer for indicating a validity period of the handover command or handover execution condition information. For example, when the timer expires, the handover command or handover execution condition information may be considered as invalid.

In addition to this, the handover execution condition information may include information, parameters, timers and the like, needed for performing various embodiments or examples described below. As an example, the handover execution condition information may include at least one of parameter information for channel quality measurement needed for performing the UE based handover, trigger condition information for reporting a measured result, a timer for restricting or suppressing measurement reporting, a timer for indicating the validity period, indication information indicating a UE based handover command and UE configuration information for accessing a target base station. For example, the UE configuration information may include a C-RNTI applied in a target base station, a target base station security algorithm identifier, a target base station dedicated RACH preamble, target base station SIB information, and the like.

The handover execution condition information or the handover command information may be configured for each of a plurality of target base stations or a plurality of target cells. That is, the source base station may configure a plurality of handover execution condition information or handover command information, each of which may be included in a container for each identifier or for each target cell or target base station.

The source base station may transmit, to a UE, high layer signaling including the handover execution condition information and the UE based handover command information, at step S520. For example, the source base station may transmit execution condition information including handover command information and condition information for executing the handover command to a UE having an RRC connection with the source base station. For example, the handover execution condition information and the handover command information may be included in an RRC connection reconfiguration message and transmitted to the UE. Further, the high layer signaling may include a plurality of handover execution condition information or handover command information, each of which may be included in a container for each identifier or for each target cell or target base station.

The UE may verify the high layer signaling received from the source base station and store a target cell configuration using the handover execution condition information. When a timer indicating the validity period is included in the handover execution condition information, the UE may release the target cell configuration when the timer expires.

When the handover execution condition information is changed, the source base station may transmit, to the UE, second high layer signaling including changed handover execution condition information and UE based handover command information, at step S530. As discussed with reference to FIG. 4, the handover command or handover execution condition information may be changed by the source base station.

For example, the source base station may change to a network based handover, such as the LTE handover procedure, after the UE based handover command has been transmitted. As an alternative, the source base station may change a target base station after a command of the UE based handover to a specific target base station has been transmitted. In this case, the source base station transmits second high layer signaling including changed handover execution condition information and handover command information to the UE When the second high layer signaling is received, the UE may replace the earlier stored target cell configuration with a second target cell configuration using the handover command information and the handover execution condition information in the second high layer signaling. To do this, the UE may release or delete the earlier stored target cell configuration and newly store the second target cell configuration according to the second high layer signaling. As an alternative, the UE may modify a target cell configuration for a target cell identical to the earlier stored target cell to become the second target cell configuration according to the second high layer signaling.

Thereafter, the UE determines whether to hand over from the source cell to the target cell by evaluating whether the handover execution condition is met. When the handover is triggered according to the handover execution condition information, the UE may control a measurement result for the target cell not to be transmitted to the source base station.

Hereinafter, embodiments for instructing a measurement configuration to a UE for performing a UE based handover will be described in detail. Further, embodiments for providing high layer signaling including handover execution condition indication to the UE for performing the UE based handover will be described in detail. A timer, indication information, restriction information, suppression information, a measurement configuration, a UE configuration, or the like described below denotes information or a parameter included in the UE based handover execution condition information described above.

First, embodiments of performing a measurement configuration by a source base station for a UE based handover for a UE will be described.

A network may instruct the UE based handover to the UE. As an example, the source base station may request the UE based handover to a target base station, receive UE configuration information for the UE based handover generated by the target base station, and then provide the received information to the UE. As another example, without requesting the UE based handover to the target base station and receiving UE configuration information for the UE based handover generated by the target base station in response to the request, the source base station may instruct a UE based handover configuration to the UE according to a determination of the source base station. As further another example, the source base station may transfer handover execution condition information for requesting the UE based handover to the target base station, receive UE configuration information for the UE based handover generated by the target base station, and then indicate the received information to the UE.

As described above, in the UE based handover, to provide related configuration information to the UE faster, a measurement configuration may be instructed using a lower threshold value than the typical handover. As an alternative, to execute efficiently the UE based handover, the UE based handover may be configured for one or more candidate target cells. To do this, more number of measurement configurations may be instructed Like this, the UE based handover may cause to generate more measurement reports due to a comparatively lower threshold value that causes faster handover triggering, or the like.

Hereinafter, embodiments of measurement configuration for the UE based handover will be described. Embodiments described below may be performed individually or in combination with one or more of embodiments or examples.

Embodiments of a prohibition/suppression timer for enabling a source base station to restrict measurement reporting The source base station may provide, to a UE, a prohibition/suppression timer (hereinafter, for convenience of description, referred to as the prohibition timer) for restricting measurement reporting. For example, the prohibition timer may be included in the handover execution condition information described above.

The prohibition/suppression timer is provided for the measurement reporting. For example, the prohibition/suppression timer may be applied for a specific event or a specific event group. As another example, the prohibition/ suppression may be applied for an entire reporting configuration. As further another example, this may be applied for entire event reporting.

As an example, when the prohibition timer is running, the UE may prohibit, suppress, or delay the measurement reporting.

As another example, in case a base station instructs the UE to perform the UE based handover; in case the UE based handover is configured; when the UE based handover is instructed and then applied; or in case an RRC message including a UE configuration for the UE based handover is received, the UE starts or restarts the prohibition timer by setting it as a value indicated by the base station.

As another example, in case the prohibition timer is indicated (e.g., instructed or provided) by the base station, the UE sets the prohibition timer as a value indicated by the base station and starts or restarts it.

As another example, in case the prohibition timer is indicated by the base station, when initiating a measurement reporting procedure, the UE sets the prohibition timer as a value indicated by the base station and starts or restarts it.

As another example, in case the prohibition timer is indicated by the base station, when transmitting measurement reporting to the base station, the UE sets the prohibition timer as a value indicated by the base station and starts or restarts it.

As another example, in case the prohibition timer is indicated by the base station, when transmitting first measurement reporting for a corresponding event to the base station, the UE sets the prohibition timer as a value indicated by the base station and starts or restarts it.

As another example, in case the prohibition timer is indicated by the base station, when transmitting measurement reporting for a corresponding event to the base station, the UE sets the prohibition timer as a value indicated by the base station and starts or restarts it.

As another example, in case measurement reporting of the UE is prohibited/suppressed/delayed according to the prohibition timer, the UE may store measurement results or measurement reporting.

As another example, in case measurement reporting of the UE is prohibited/suppressed/delayed according to the prohibition timer, the UE may discard/release/stop corresponding measurement results or measurement reporting.

As another example, in case measurement reporting of the UE is prohibited/suppressed/delayed according to the prohibition timer, the UE may suspend/stop corresponding measurement.

As another example, when the prohibition timer expires, the UE transmits measurement reporting. For example, the UE transmits stored measurement results or measurement reporting. As an alternative, the UE transmits measurement results or measurement reporting at a current time when the timer expires.

The prohibition timer for restricting measurement reporting may be instructed to the UE along with information (e.g., handover command information, or handover execution condition information) indicating the UE based handover. As another example, the prohibition timer may be activated when information indicating a UE based handover is configured.

The UE receiving information indicating a UE based handover may perform one or more of the following operations.

The UE maintains a connection with a source cell (e.g., a source base station). The UE may request scheduling to the source cell, or the scheduling may be indicated to the UE.

The UE stores a target cell configuration (e.g., a UE configuration/RRC context/RRC IE/L1, L2 configuration information) information for executing the handover to a target cell.

The UE monitors a trigger condition (e.g., a rule, a regulation, or an event) for determining handover execution.

Embodiments of a prohibition/suppression timer for enabling a target base station to control measurement reporting A target base station may instruct a prohibition timer for restricting measurement reporting to a UE. To do this, the target base station may transfer an RRC message including handover execution condition information (e.g., including UE configuration information) for instructing the UE based handover to the UE via a source base station.

The UE receiving information instructing a UE based handover may perform one or more of the following operations.

The UE maintains a connection with a source cell (e.g., the source base station). The UE may request scheduling to the source cell, or the scheduling may be indicated to the UE.

The UE stores a target cell configuration (e.g., a UE configuration/RRC context/RRC IE/L1, L2 configuration information) information for executing the handover to a target cell.

The UE monitors a trigger condition (e.g., a rule, a regulation, or an event) for determining handover execution.

The prohibition/suppression timer is for the measurement reporting. As an example, the prohibition/suppression timer may be applied for a specific event or a specific event group.

As another example, the prohibition/suppression timer may be applied for an entire reporting configuration. As further another example, the prohibition/suppression timer may be applied for entire event reporting.

As an example, when the prohibition timer is enabled or running, the UE may prohibit, suppress, or delay the measurement reporting.

As another example, in case a base station instructs the UE to perform the UE based handover; in case the UE based handover is configured; when the UE based handover is instructed and then applied; or in case an RRC message including a UE configuration for the UE based handover is received, the UE starts or restarts the prohibition timer by setting it as a value indicated by the base station.

As another example, in case the prohibition timer is indicated (e.g, provided or instructed) by the base station, the UE sets the prohibition timer as a value indicated by the base station and starts or restarts it.

As another example, in case the prohibition timer is indicated by the base station, when initiating a measurement reporting procedure, the UE sets the prohibition timer as a value indicated by the base station and starts or restarts it.

As another example, in case the prohibition timer is indicated by the base station, when transmitting measurement reporting to the base station, the UE sets the prohibition timer as a value indicated by the base station and starts or restarts it.

As another example, in case the prohibition timer is indicated by the base station, when transmitting first measurement reporting for a corresponding event to the base station, the UE sets the prohibition timer as a value indicated by the base station and starts or restarts it.

As another example, in case the prohibition timer is indicated by the base station, when transmitting measurement reporting for a corresponding event to the base station, the UE sets the prohibition timer as a value indicated by the base station and starts or restarts it.

In case measurement reporting of the UE is prohibited/suppressed/delayed according to the prohibition timer, the UE may store measurement results or measurement reporting.

As another example, in case measurement reporting of the UE is prohibited/suppressed/delayed according to the prohibition timer, the UE may discard/release/stop corresponding measurement results or measurement reporting.

As another example, in case measurement reporting of the UE is prohibited/suppressed/delayed according to the prohibition timer, the UE may suspend/stop corresponding measurement.

When the prohibition timer expires, the UE may transmit measurement reporting. As an example, the UE may transmit stored measurement results or measurement reporting. As another example, the UE may transmit measurement results or measurement reporting at a current time when the prohibition timer expires.

Embodiments of indicating prohibition/suppression indication information for enabling a source base station or a target base station to restrict measurement reporting A source base station or a target base station may indicate (e.g., provide) prohibition/suppression indication information for restricting measurement reporting to a UE. As an example, the source base station may transfer, to the UE, an RRC message including UE configuration information for indicating the UE based handover. As another example, to do this, the target base station may transfer an RRC message including UE configuration information for indicating the UE based handover to the UE via the source base station.

As further another example, to do this, the source base station may transfer UE configuration information for indicating the UE based handover to target base station, and the target base station may transfer an RRC message including the UE configuration information for indicating the UE based handover the UE via the source base station.

The UE receiving information indicating a UE based handover may perform one or more of the following operations.

The UE maintains a connection with a source cell. The UE may request scheduling to the source cell, or the scheduling may be indicated to the UE.

The UE applies configuration information for handover execution to the source cell.

The UE stores a target cell configuration (e.g., a UE configuration/RRC context/RRC IE/L1, L2 configuration information) information for executing the handover to a target cell.

The UE monitors a trigger condition (e.g., a rule, a regulation, or an event) for determining handover execution.

Even when a reporting condition/event is satisfied based on the monitoring results for the condition/event for determining (e.g., triggering) handover execution, the UE may not trigger or transfer measurement reporting.

Even when a reporting condition is satisfied based on the monitoring results of the condition/event for determining handover execution, the UE may prohibit/suppress triggering/transferring measurement reporting.

The prohibition/suppression indication information represents information for indicating prohibition/suppression/restriction for the measurement reporting. As an example, the prohibition/suppression indication information may be applied for a specific event or a specific event group. As another example, the prohibition/suppression indication information may be applied for an entire reporting configuration. As further another example, the prohibition/suppression indication information may be applied for entire event reporting.

For example, when the prohibition indication information is provided to the UE, configured in the UE, or enabled or running, the UE may prohibit/suppress/delay the measurement reporting.

As further another example, in case a base station instructs the UE to perform the UE based handover; in case the UE based handover is configured in the UE; when the UE based handover is instructed and then applied in the UE; or in case the UE receives an RRC message including a UE configuration for the UE based handover, the UE may restrict initiation or transfer of reporting or measurement reporting according to RRM measurement or RRM measurement evaluation. As an alternative, the UE may not perform one or more of the trigger/transfer/initiation of reporting or measurement reporting according to the RRM measurement or the RRM measurement evaluation.

As methods described above, the base station may perform control operations for restricting measurement reporting of the UE, and the UE may restrict measurement reporting according to corresponding control operations as well. Hereinafter, embodiments of enabling a base station to control the UE based handover will be discussed.

An example of enabling a source base station or a target base station to provide (e.g., instruct) a validity period/timer/time value for restricting the UE based handover.

A source base station or a target base station may provide a validity period/timer/time value for restricting the UE based handover. The validity period/timer/time value may be included in the handover execution condition information described above.

In the typical technology, when one or more cells satisfy an event triggering condition, the UE triggers an event for reporting measurement results of one or more cells in a measurement report message. When the prohibition timer for restricting the UE based handover, the prohibition indication information for restricting the UE based handover, or the validity period/timer/time value for restricting the UE based handover is indicated, the UE may perform one or more of the following operations based on the indicated information.

The UE maintains a connection with a source cell. The UE may request scheduling to the source cell, or the scheduling may be indicated to the UE.

The UE applies configuration information for handover execution to the source cell.

The UE sets a specific timer for restricting the UE based handover as a validity period/timer/time value indicated (e.g., instructed or provided) by a base station, and then starts or restarts it.

The UE stores a UE configuration/RRC context/RRC IE/L1, L2 configuration information for executing a handover to a target cell.

The UE performs measurement for a condition/event for determining handover execution.

Even when a reporting condition/event is satisfied based on the measurement results for the condition/event for determining handover execution, the UE may control measurement reporting not to be triggered/transferred/initiated.

Even when a reporting condition/event is satisfied based on the measurement results of the condition/event for determining handover execution, the UE may prohibit/suppress the trigger/transfer/initiation of measurement reporting.

As an example, the embodiment may be applied for a specific event or a specific event group. As another example, the embodiment may be applied for an entire reporting configuration. As further another example, the embodiment may be applied for entire event reporting.

As an example, when a specific timer for restricting the UE based handover is indicated, configured, enabled, or run, the UE measures a condition/event for determining handover execution. When the condition/event is satisfied, the UE may perform UE based handover execution. For example, the UE may perform one or more of initiating random access, performing synchronization, applying UE configuration information, and transmitting a handover complete message to a target cell.

As another example, in case a base station instructs the UE to perform the UE based handover; in case the UE based handover is configured in the UE; when the UE based handover is instructed and then applied in the UE; or in case the UE receives an RRC message including a UE configuration for the UE based handover, the UE may prohibit/suppress/restrict the trigger of reporting or measurement reporting according to RRM measurement or RRM measurement evaluation. As an alternative, the UE may not perform one or more of the trigger/transfer/initiation of reporting or measurement reporting according to the RRM measurement or the RRM measurement evaluation. As an alternative, the UE measures a condition/event for determining handover execution, and when the condition/event is satisfied, the UE may initiate/perform UE based handover execution. For example, the UE may perform one or more of initiating random access, performing synchronization, applying UE configuration information, and transmitting a handover complete message to a target cell.

As another example, when a specific timer for restricting the UE based handover expires, the UE may release or discard a condition/event for UE based handover execution or UE configuration information for UE based handover execution.

As further another example, in the UE based handover, the UE occupies a target base station resource until the UE determines handover execution. However, it is undesirable for this situation to persist for a long time. Accordingly, the target base station may indicate (e.g., provide or instruct) information for restricting the UE based handover execution (a maximum waiting time). For example, to do this, a timer value may be provided. The timer value may be included in the handover execution condition information. The UE receiving information instructing the UE based handover starts a timer for restricting the UE based handover execution (a maximum waiting time). As an example, when the UE based handover execution is triggered or determined, the UE may stop the corresponding timer. As another example, when the corresponding timer expires before the UE based handover execution is triggered or determined, the UE may stop a condition/event for the handover. As further another example, when the corresponding timer expires before the UE based handover execution is triggered or determined, handover execution condition information (including UE configuration information) for performing handover execution may be released.

As described above, the UE receives information for restricting measurement reporting and information for restricting UE based handover execution. As results, the UE may perform a measurement reporting operation, a UE based handover operation, a handover execution condition information release operation, or the like.

Hereinafter, various embodiments for enabling a base station to instruct a UE based handover command to a UE will be described. Information described below may be included in the UE based handover command information or the handover execution condition information described above.

For an RRC connected UE, the base station is required to correctly recognize capabilities of the UE to provide a configuration suitable for the UE. A core network control entity of the UE stores UE capabilities including a UE radio access capability and a UE core network capability.

For example, the UE core network capability may be provided by the UE through NAS signaling (attach procedure, etc.). As another example, the UE radio access capability may be transferred from the UE to the base station using a UE capability transfer procedure and transferred to the core network control entity via an interface between the base station and the core network control entity. When the base station transmits a UE capability enquiry message to the UE, the base station may receive UE capability information by replying of the UE to this through UE capability information.

As further another example, the UE radio access capability may be provided to the core network control entity by the UE through NAS signaling (attach procedure, etc.), and transferred to the base station via the interface between the base station and the core network control entity.

The core network control entity may transmit the UE radio access capability to the base station whenever the UE enters an RRC connection state.

The UE may provide UE capability information representing a UE based handover capability to the base station.

The UE capability information may represent a capability for each specific band or for each specific band combination, or represent a capability irrespective of the band. That is, the base station may verify whether the UE is available to execute the UE based handover through the UE capability information.

Meanwhile, the network may instruct (e.g., provide) a measurement configuration and a measurement reporting configuration to the UE. Based on this, the measurement reporting may be received.

For example, the network (e.g., base station) may instruct (e.g., provide) a UE based handover configuration based on the measurement reporting to the UE. The base station may determine whether to instruct a UE based handover command to the UE by receiving at least one of the UE capability information and the measurement report.

Meanwhile, cooperation between a source base station and a target base station may be required to perform the UE based handover. Related embodiments will be described below, and the following embodiments may be applicable individually or in combination with one or more embodiments or examples.

An embodiment of enabling a source base station to transmit UE based handover (request) indication information to a target base station As described above, in the typical handover technology, a target base station allocates a new C-RNTI, a dedicated RACH preamble, or the like to be used in a UE according to a handover request of a source base station. In the case of applying the UE based handover, there is a possibility that one or more resource(s) allocated by the target base station may not be used for a certain period until a handover is executed. If the target base station has a heavy load, it may be desirable not to allow a UE based handover before the target base station generates such a configuration. Further, if needed, it may be desirable for the target base station to recognize that a corresponding handover is the UE based handover during waiting for the execution of the UE based handover. In addition to this, when the target base station does not support a UE based handover functionality, there may be a need for enabling the target base station to response taking into this account.

Accordingly, before a source base station commands the UE based handover to a UE, a procedure may be needed for reflecting a situation of the target base station by transmitting a request or indication information related to the UE based handover to the target base station.

For example, when the source base station determines the UE based handover, the source base station may include information for indicating the UE based handover (or information for requesting the UE based handover, or condition information for the UE based handover, for convenience of description and ease of understanding, hereinafter, may be referred to as "information for indicating the UE based handover") in a handover request message. Then, the source base station may transmit the handover request message including the information for indicating the UE based handover to the target base station.

As another example, when the source base station determines the UE based handover, the source base station may include information for indicating the UE based handover in a handover preparation message included in the handover request message and then transmit the message including the information to the target base station.

As further another example, to receive help information for determining the UE based handover from the target base station, the source base station may include the information for indicating the UE based handover in the handover request message (e.g., set to true) and then transmit the message including the information to the target base station.

As yet another example, to receive help information for determining the UE based handover from the target base station, the source base station may include the information for indicating the UE based handover in a handover preparation message included in the handover request message and then transmit the message including the information to the target base station.

Hereinafter, embodiments of operations of a target base station that receives information for requesting the corresponding UE based handover will be described.

A Method of Handling a UE Based Handover when the Target Base Station does not Allow the UE Based Handover As described above, the target base station may not support the UE based handover. As an alternative, the target base station may not allow the UE based handover due to its load or other reason(s).

For example, when the target base station does not allow the UE based handover, or when a preparing operation of the UE base handover is failed while preparing the UE based handover, the target base station may transfer a handover preparation failure message to a source base station. The target base station may transmit the handover preparation failure message by including a cause value (e.g., non-admission for the UE based handover or a failure in the UE based handover) for this to the source base station.

As another example, even when the target base station does not allow the UE based handover, the target base station may allow a typical network based handover. In this case, the target base station prepares a handover by processing a handover request message from a source base station according to a network based handover preparation procedure and generates an RRC message to be transferred to a UE for performing the handover (for example, an RRCConnectionReconfiguration message including the mobilityControlInformation). Thereafter, the target base station transmits a handover request acknowledgment message to the source base station. As an example, the handover request acknowledgment message or the RRC message included in the handover request acknowledgment message may include indication information for responding/acknowledging/indicating that the UE based handover has not been configured. As another example, the handover request acknowledgment message or the RRC message included in the handover request acknowledgment message may include indication information (e.g., set to a network based handover) for differentiating between the UE based handover and the network based handover. As further another example, the handover request acknowledgment message or the RRC message included in the handover request acknowledgment message may be configured and transmitted only a network based handover request acknowledgment message or an information element included in a handover request acknowledgment message, without including information for differentiating the UE based handover.

Upon the receipt of the network based handover request acknowledgment message through the handover request acknowledgment message or the RRC message included in the handover request acknowledgment message, the source base station may transmit the received message to the UE. As an alternative, for this, the source base station may transmit a handover canceled message to the target base station and cancel the handover.

Upon the receipt of the RRC message included in the handover request acknowledgment message from the source base station, the UE may perform the handover according to a network based handover procedure.

Like this, the source base station may verify whether the target base station allows (e.g., support) the UE based handover, determine a type of handover, and process a related procedure.

An embodiment of enabling a target base station to include and transmit UE based handover indication information A source base station may include handover preparation information in a handover request message and then transfer the message including the information to the target base station. That is, the source base station may request a handover to the target base station according to a procedure similar to the network based handover. In this case, the source base station may not specify whether the handover request is based on a UE or a network. Accordingly, when the target base station receives the handover request message, the target base station may determine a type of handover taking into account the situation of the target base station or capabilities of a UE.

For example, the handover preparation information in the handover request message transferred from the source base station to the target base station may include capability information for the UE based handover. When the target base station supports a UE based handover functionality, the target base station prepares a UE based handover. For example, the target base station generates UE configuration information for the UE based handover.

As another example, the handover request message or the handover preparation information in the handover request message transferred from the source base station to the target base station may include UE based handover request indication information as described above.

The target base station transmits a handover request acknowledgment message to the source base station.

The handover request acknowledgment message is an RRC message for performing the UE based handover and may be included in a container to be transmitted to a UE. This container may include one or more of a new C-RNTI, a target eNB security algorithm identifier, a dedicated RACH preamble, and target eNB SIB s. For example, the RRC message is an RRC reconfiguration message including the mobilitycontrolInfo. Such a RRC message is generated by the target base station and then transferred to the UE through the source base station. The target base station may additionally include information for instructing the UE based handover in an RRC message to be transmitted to the UE. As another example, the target base station may additionally include information for instructing the UE based handover in a handover request acknowledgment message or an RRC message. For example, through this, the source base station may indicate the UE based handover to the UE.

When the UE receives information instructing a UE based handover, the UE may perform one or more of the following operations.

The UE maintains a connection with a source cell. The UE may request scheduling to the source cell, or the scheduling may be indicated to the UE.

The UE stores a UE configuration/RRC context/RRC IE/L1, L2 configuration information for executing a handover to a target cell.

The UE performs measurement for a condition/event for determining handover execution.

The target base station may generate and provide execution condition information for the execution of the UE based handover. Hereinafter, information included in the execution condition information is described in detail by being divided into event indication information, UE configuration information, and execution restriction information.

A Method of Enabling a Target Base Station to Indicate an Event for Performing a UE Based Handover For example, the target base station may include condition/event configuration information for a UE based handover operation in a handover request acknowledgment message or an RRC message. To do this, a source base station may add and transfer information for helping the target base station configure the UE based handover. For example, the source base station may provide measurement configuration information of the source base station to the target base station. As another example, the source base station may provide event configuration information of the source base station to the target base station. As further another example, the source base station may provide condition configuration information for the UE based handover to the target base station. As yet another example, the source base station may provide RRM measurement result(s) of the source base station to the target base station. Specifically, the source base station may provide RSRP/RSRQ/RS-SINR measurement result(s) of a candidate cell to the target base station. As yet another example, the source base station may provide an event reporting result of the source base station to the target base station. Specifically, the information provided to the target base station may include measurement event related information including one or more of an event at which a UE based handover request is triggered by the source base station, whether reporting for each event has been performed or is required, a request time, an A3 event configuration, whether an A3 event is satisfied, time-to-trigger information, mobility state information (t-hystnormal, t-evaluation, n-cellchangemedium, or n-cellchangehigh), UE cell change information and a UE based handover condition. As yet another example, the source base station may provide event configuration information for UE based handover execution of the target base station according to the suggestion of the source base station. For example, A3 event information, or the like may be included in this.

A Method of Enabling a Target Base Station to Indicate UE Configuration Information for Performing a UE Based Handover For example, when the target base station satisfies a condition/event for the UE based handover in a handover request acknowledgment message or an RRC message, the target base station may include UE configuration information for performing handover execution to a target cell by disconnecting an existing connection with a source cell in the handover request acknowledgment message or the RRC message, and then transfer to the source base station.

A Method of Enabling a Target Base Station to Indicate Information for Restricting UE Based Handover Execution As described above, in the UE based handover, a UE occupies a target base station resource until the UE determines handover is performed. However, it is undesirable for this situation to persist for a long time. Accordingly, the target base station may indicate information for restricting the UE based handover execution (e.g., a maximum waiting time). For example, the target base station may indicate a timer value for indicating a validity period of handover execution. The UE receiving information indicating the UE based handover starts a timer for restricting a validity period (a maximum waiting time) of the UE based handover execution. For example, when the UE based handover execution is triggered/initiated/determined/performed, the corresponding timer may be stopped. As another example, when the corresponding timer expires before the UE based handover execution is triggered/initiated/determined/performed, a condition/event for the handover may be stopped. As further another example, when the corresponding timer expires before the UE based handover execution is triggered/initiated/determined/performed, a target cell configuration including UE configuration information for performing handover execution may be released.

An embodiment of enabling a source base station to include and transmit UE based handover indication information Unlike the embodiment described above, a source base station, not a target base station, may configure information for indicating the UE based handover and then transmit the configured information to a UE.

In the UE based handover, a UE may determine handover execution according to UE based handover configuration information (e.g., handover execution condition information) pre-configured under the control of a base station. In the UE based handover compared with the network based handover technology, handover commands may be issued faster; thus, it is possible to reduce a handover failure. For example, in the network based handover technology, when a UE verifies that a specific event satisfied to a measurement configuration occurs, the UE reports this to a base station. Until the base station transmits a handover command to the UE through a handover preparation procedure with a target base station, in case a wireless environment suddenly changes due to blockage or the like, there is a possibility that a handover may fail. However, in case the UE based handover configuration has been instructed to the UE at an earlier time, the UE may trigger the handover execution without experiencing a handover failure.

Accordingly, a source base station may configure information for instructing a UE based handover to the UE.

When the source base station is allowed to provide the information for instructing the UE based handover, the source base station may include a UE based handover configuration (e.g., handover execution condition information, etc.) for one or more target base station(s) (target cell(s)) in one RRC message, and then provide to the UE.

In this case, it is necessary for the source base station to include, in one RRC message, a UE based handover configuration for the target base station/cell and a configuration for the target base station/cell, which are differentiated from each other, and then provide it to the UE. For example, an RRC container/message/command/part/information elements/indication information including a UE based handover configuration for a target base station/cell, and an RRC container/message/part/information elements/indication information for indicating by the source base station to the UE, which are differentiated from each other, may be included by the source base station.

As another example, when the source base station includes a UE based handover configuration and a configuration for a source base station/cell, which are differentiated from each other, in one RRC message, and then provides the RRC message to the UE, each of the RRC containers/messages/commands/parts/information elements/indication information may include information (e.g., an index, an ID, an identifier, a differentiated number, transaction ID, or the like) for differentiating from each other.

As further another example, when the source base station includes UE based handover configurations for a plurality of target cells differentiated from one another in one RRC message and then provides the RRC message to the UE, each of the RRC containers/messages/commands/parts/information elements/indication information may include information (e.g., an index, an ID, an identifier, a differentiated number, transaction ID, or the like) for differentiating from each other.

As yet another example, when the source base station is allowed to provide the information for instructing the UE based handover, the source base station may provide information for restricting one or more validity period(s) of UE based handover execution for one or more target base station(s) (target cell(s)). For example, to do this, the source base station may instruct a timer value. When the UE receives the information instructing the UE based handover, the UE starts a timer for restricting a validity period of the UE based handover execution. For example, when the UE based handover execution is triggered/initiated/determined/ performed, the corresponding timer may be stopped. As another example, when the corresponding timer expires before the UE based handover execution is triggered/initiated/determined/performed, a condition/rule/regulation/ event for the handover may be stopped. As further another example, when the corresponding timer expires before the UE based handover execution is triggered/initiated/determined/performed, target cell configuration information (including UE configuration information) for performing handover execution may be released. As yet another example, when the corresponding timer expires before the UE based handover execution is triggered/initiated/determined/performed, the UE may transmit a message for canceling/ releasing the UE based handover to the target base station.

When an RRC message including the information for instructing the UE based handover is received, the UE may perform the UE based handover operations described above. As another example, the UE may transmit an RRC acknowledgment message to the source base station.

When an RRC message instructing a network based handover, which does not include the information for indicating the UE based handover, is received, the UE may perform typical network based handover operations. The UE may release all target cell configuration(s) for the UE based handover stored earlier.

As described above, the UE based handover for a plurality of target base stations or target cells may be instructed to the UE. In this case, when the UE performs the UE based handover relative to a specific target base station or target cell, to prevent a resource from being wasted, the UE based handover for one or more remaining target base station(s) or target cell(s) should be canceled. Hereinafter, related embodiments will be described.

An embodiment of instructing the cancellation of a handover to one or more remaining target base station(s) when a UE has completed a handover.

In the UE based handover, UE based handover configuration(s) for one or more target base station(s)/cell(s) may be instructed to a UE. For example, by a UE based handover request of a source base station, one target base station (for convenience of description, referred to as "first target base station") may generate a UE configuration for a UE based handover and provide the UE configuration to the UE via the source base station. Thereafter, based on the reception of measurement reporting or any other reason, the source base station may request a UE based handover to another target base station (for convenience of description, referred to as "second target base station") other than the first target base station, and then, the second target base station may generate another UE configuration for the UE based handover and indicate this to the UE via the source base station.

In this case, as an example, when the UE configuration for the UE based handover by the second target base station is received, the UE may release/discard the UE configuration for the UE based handover by the first target base station. That is, the UE may release first target base station (first target cell) configuration information stored in the UE based on information received earlier and store second target base station (second target cell) configuration information based on information newly received. As an alternative, when determining the UE based handover by the second target base station; when receiving a response in response to a UE based handover request from the second target base station; or when indicating, to the UE, the UE configuration for the UE based handover generated by the second target base station, the source base station may instruct the UE to cancel/release the UE based handover preparation/configuration to the first target base station.

As another example, even when the UE configuration for the UE based handover by the second target base station is received, the UE may maintain the UE configuration for the UE based handover by the first target base station and perform operations for triggering/initiating/determining/performing UE based handover execution for the second target base station.

As further another example, the source base station may request respective UE based handovers to both the first target base station and the second target base station. The source base station may receive respective UE based handover configurations from respective target base stations and provide the respective UE based handover configurations to the UE through one RRC message.

When one or more UE based handover configuration(s) for one or more target cell(s)/base station(s) is/are instructed and when a handover to any one target cell/base station is completed, it is necessary to release the handover preparation of remaining target cell(s)/base station(s). To do this, when the source base station receives a handover complete indication (e.g., a UE context release message) from any target base station, the source base station may instruct the cancellation/release of the UE based handover to the remaining target base station(s).

As another example, when the UE performs operations for triggering/initiating/determining/performing the UE based handover for any one target cell, or when satisfaction in a related condition/rule/event is informed, the UE may release/discard a condition/rule/regulation/event for UE based handover execution for the remaining target cell(s)/ base station(s) or UE configuration information for the UE based handover execution. A time point at which such an operation is performed may be set to at least one of a time point at which a RACH is transmitted to a corresponding target cell, a time point at which a random access preamble is transmitted, a time point at which a random access response is received in the target cell, a time point at which random access is completed in the target cell, and a time point at which an UL signal is transmitted to the target cell, a time point at which synchronization is established with the target cell, a time point at which a radio resource of the target cell is configured, and a time point at which an RRC confirmation message is initiated/submitted/transmitted to the target cell. These time points may be specified by the RRC connection reconfiguration message, or pre-configured.

As another example, when the UE leaves an RRC connected state due to a radio link failure, or the like, the UE may release/discard a condition/rule/regulation/event for UE based handover execution or UE configuration information for the UE based handover execution.

As another example, when the source base modifies/changes/releases/re-indicates a UE based handover configuration for a specific target cell, the UE may release/discard the UE based handover configuration stored/pending for the corresponding target cell. The source base station may indicate the cancellation/release of the UE based handover to the corresponding target base station.

As another example, when the source base modifies/changes/re-indicates a UE based handover configuration for a specific target cell, the UE may store the UE based handover configuration for the corresponding re-indicated target cell. When the source base modifies/changes/re-indicates a UE based handover configuration for a corresponding target cell, the UE may replace a UE based handover configuration for the corresponding re-indicated target cell with the earlier UE based handover configuration for the corresponding target cell. For example, the UE may modify and store a target cell configuration for a target cell identical to the earlier stored target cell to become the second target cell configuration according to the second high layer signaling.

As another example, when the source base station modifies/changes/indicates a configuration for a source cell, the UE may apply the configuration of the source cell.

As described above, for performing the UE based handover, a source base station or a target base station generates handover execution condition information including UE configuration information, and the source base station provides this to a UE. The UE may store target cell configuration information including UE configuration information using the received handover execution condition information and UE based handover command information and perform the UE based handover by monitoring whether a condition is met or an event occurs without a separate additional indication of the source base station. Discussions have been conducted on various embodiments in cases where execution condition information for a plurality of target base stations is simultaneously or sequentially received in the UE.

Through this, the UE is able to stably perform a handover to the target base station faster in the case of connection interruption that may occur due to any reason during the handover procedure.

Hereinafter, by focusing on all or part of embodiments or examples described above, the entire procedure of the UE based handover will be discussed again with reference to the drawings.

Figure 6:
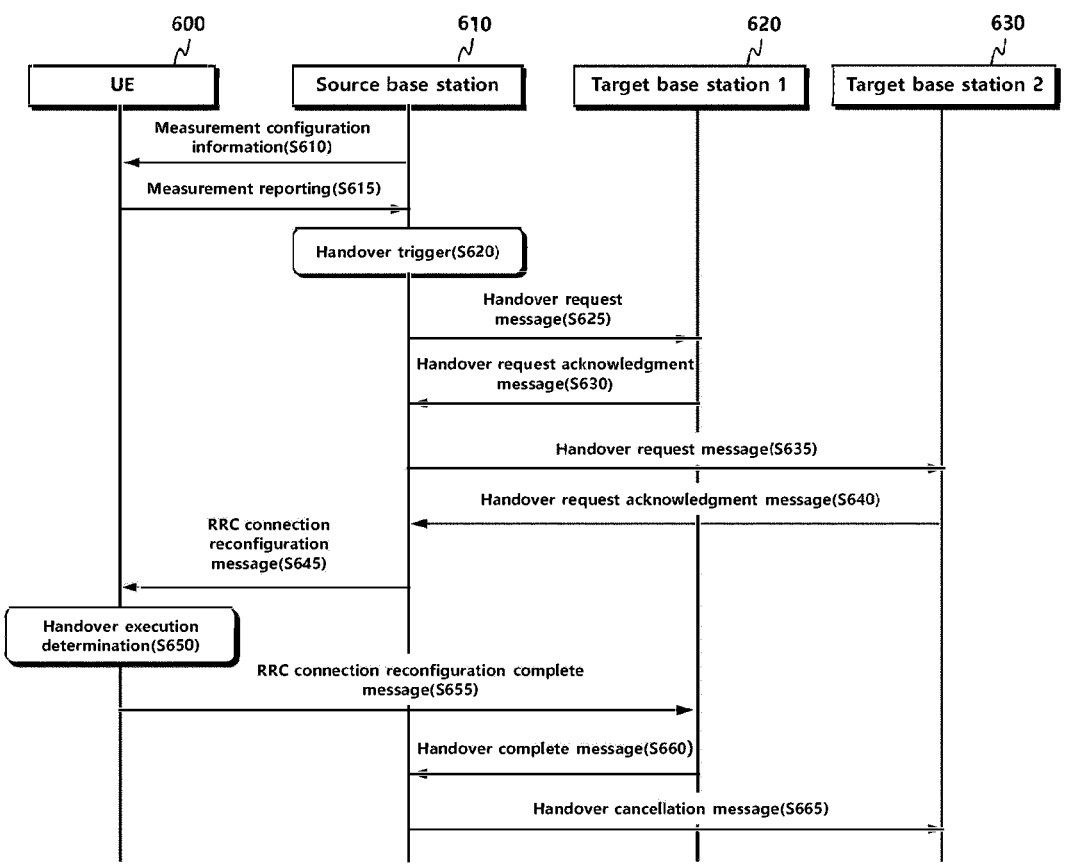
FIG. 6 is a diagram illustrating a UE based handover procedure according to one embodiment of the present disclosure.

FIG. 6 is a diagram illustrating a UE based handover procedure according to one embodiment of the present disclosure.

Referring to FIG. 6, a source base station 610 may perform a UE based handover procedure using handover execution condition information generated by target base stations 620 and 630.

For example, the source base station 610 may transmit measurement configuration information for handover determination to a UE 600, at step S610. The UE 600 measures radio channel quality for a target cell or a neighboring cell using the measurement configuration information, includes the measured result in measurement reporting, and transmits the measurement reporting including the measured result to the source base station 610, at step S615. The source base station 610 determines whether to trigger a UE based handover taking into account the measurement reporting information, UE capabilities, and the like, at step S620.

When the UE based handover is determined to perform, the source base station 610 transmits one or more handover request message(s) to the first target base station 620 and the second target base station 630 if needed, at steps S625 and S635. As described above, the handover request message may include information representing whether the requested handover is the UE based handover and information for helping the target base stations 620 and 630 generate respective UE configuration information for the UE based handover. The first target base station 620 or the second target base station 630 determines whether to allow the UE based handover and transmits a handover request acknowledgment message including execution condition information (including target cell configuration information, UE configuration information, and the like) to the source base station 610, at step S630 or S640.

The source base station 610 transmits, to the UE 600, an RRC connection reconfiguration message including the execution condition information (including the target cell configuration information, the UE configuration information, and the like) received from the target base stations 620 and 630, at step S645. The RRC connection reconfiguration information may include at least one of UE based handover command information and handover execution condition information. Further, as described above, the RRC connection reconfiguration information may include respective execution condition information for a plurality of target base stations, which is differentiated from one another.

The UE 600 stores the target cell configuration information and determines whether the UE based handover execution condition is met based on a rule or an event of the execution condition information, at step S650. In this case, when a restriction timer described above is operated and a validity period has passed, the execution condition information or the UE based handover command may be released. When handover execution is determined to the first target base station 620, the UE 600 performs a handover procedure and an access procedure with the first target base station 620 and transmits an RRC connection reconfiguration complete message to the first target base station 620, at stop S655.

The first target base station 620 informs that the handover with the UE 600 has been completed by transferring a handover complete message to the source base station 600, at step S660. If needed, the source base station 600 transmits a handover cancellation message to the second base station 630 to prevent resources from being occupied unnecessarily, at step S665.

Figure 7:
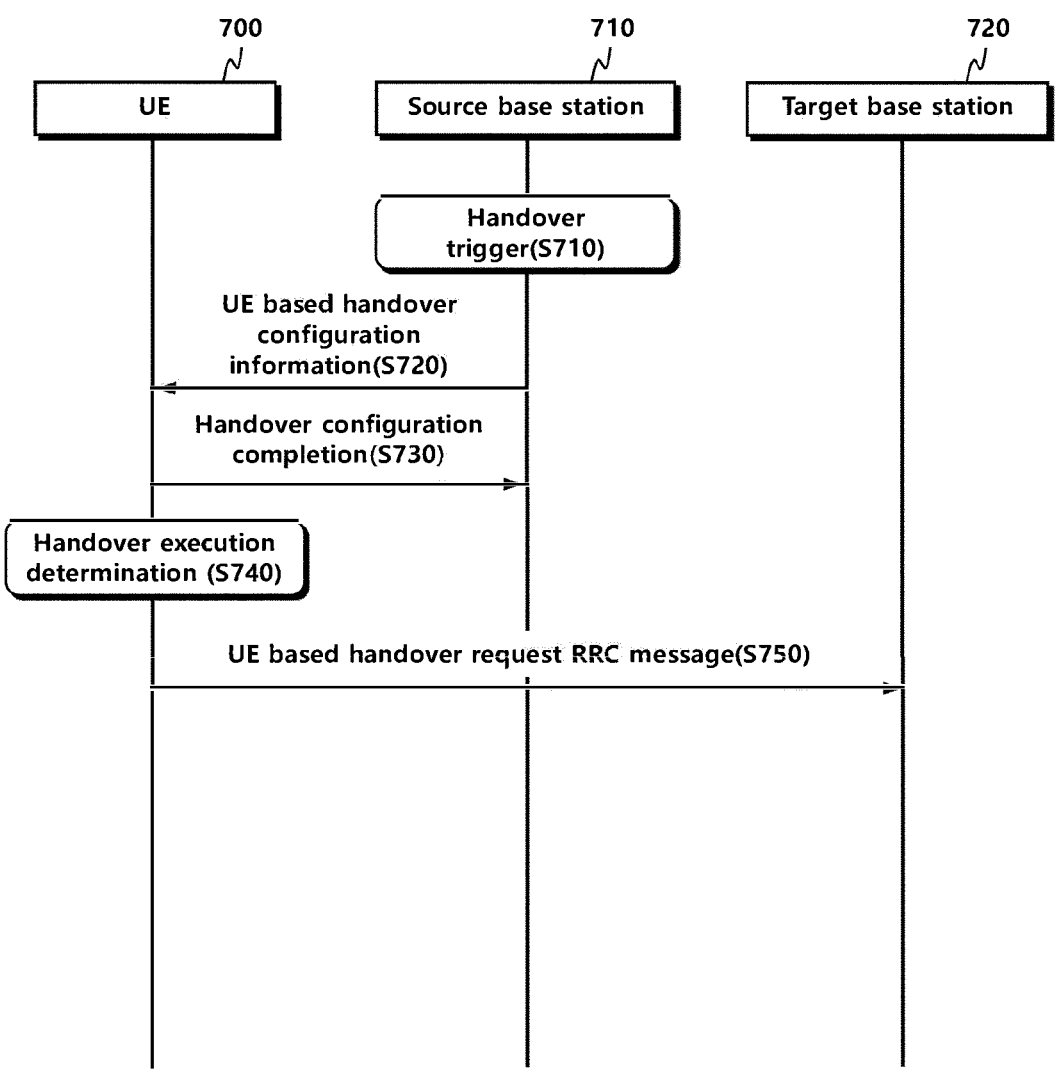
FIG. 7 is a diagram illustrating a UE based handover procedure according to another embodiment of the present disclosure.

FIG. 7 is a diagram illustrating a UE based handover procedure according to another embodiment of the present disclosure.

Referring to FIG. 7, a source base station 710 may directly configure handover execution condition information to be transmitted to a UE 700. That is, without generating, by the target base station 720, a UE based handover request to a target base station 720 and execution condition information (including UE configuration information) for the UE based handover in response to the request, the source base station 710 may instruct a UE based handover configuration to the UE according to a determination of the source base station.

For example, the source base station 710 may determine whether to trigger a handover of the UE 700, at step S710. If needed, the source base station 710 may determine whether to trigger the UE based handover by receiving measurement reporting from the UE 700. As an alternative, the source base station 710 may determine the UE based handover without the measurement reporting.

When the UE based handover is determined, the source base station 710 transmits UE based handover configuration information to the UE 700, at step S720. For example, the UE based handover configuration information may include UE based handover command information and handover execution condition information described above. Further, this may be transmitted by being included in an RRC connection reconfiguration message.

When the UE 700 stores and configures UE based handover configuration information in the UE 700, the source base station 710 may receive handover configuration complete information, at step S730.

Thereafter, the UE 700 determines whether to perform the UE based handover execution to the target base station 720 based on the handover execution condition information, at step S740. When the UE based handover execution is determined, the UE 700 may transmit an RRC message requesting the UE based handover to the target base station, at step S750.

Hereinbefore, for more specific discussions, handover execution condition information has been described as UE configuration information, target cell configuration information, target base station configuration information, handover configuration information, or the like; however, it should be noted that these terms denote a timer, an event, a condition, a rule, a restriction/suppression information, or the like needed for enabling a UE to perform the UE based handover. The execution condition information or all or each of these terms may denote one parameter applied to all these terms. Alternatively, the execution condition information or all or each of these terms may denote handover execution condition information itself. Accordingly, embodiments of the present disclosure are not limited to a specific term.

As described above, the UE based handover is efficiently performed in accordance with embodiments of the present disclosure. Accordingly, it is possible to prevent resources of a target base station from being wasted and to enable a UE to perform handover quickly and stably.

Hereinafter, configurations of the UE and the base station for performing a part or all of embodiments described above will be discussed with reference to the drawings.

Figure 8:
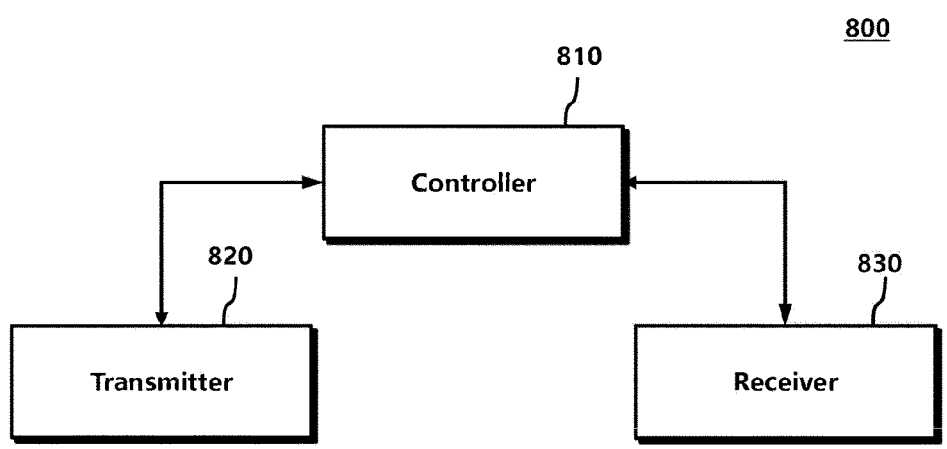
FIG. 8 is a block diagram illustrating a configuration of the UE according to at least one embodiment of the present disclosure.

FIG. 8 is a block diagram illustrating a UE according to at least one embodiment of the present disclosure.

Referring to FIG. 8, the UE 800 performing a UE based handover may include a receiver 830 configured to receive high layer signaling including UE based handover command information and handover execution condition information for executing the UE based handover command from a source base station, and a controller 810 configured to store a target cell configuration using the handover execution condition information.

The controller 810 may evaluate whether the handover execution condition information is met and determine whether to perform a handover procedure to the target cell.

The receiver 830 may receive execution condition information including handover command information and condition information for executing the handover command from a source base station having an RRC connection with the UE. As an example, the handover execution condition information and the handover command information may be received by being included in an RRC connection reconfiguration message.

A target base station may configure the handover execution condition information and transmit the handover execution condition information to the source base station. As another example, the source base station may configure the handover execution condition information. For example, the handover execution condition information may include a timer for indicating a validity period of the handover command or handover execution condition information. For example, when the timer expires, the handover command or handover execution condition information may be considered as invalid. In addition to this, the handover execution condition information may include parameters, timers and the like, needed for determining whether to execute the UE based handover. For example, the handover execution condition information may include at least one of parameter information for channel quality measurement needed for performing the UE based handover, trigger condition information for reporting a measured result, a timer for restricting or suppressing measurement reporting, a timer for indicating the validity period, indication information indicating a UE based handover command and UE configuration information for accessing a target base station.

The handover execution condition information or the handover command information may be configured for each of a plurality of target base stations or a plurality of target cells. That is, the high layer signaling may include a plurality of handover execution condition information or handover command information, each of which may be included in a container for each identifier or for each target cell or target base station.

For example, when UE based handover command information and handover execution condition information are received, the controller 810 may verify whether the UE based handover is indicated and store the target cell configuration according to the handover execution condition information. For example, the controller 810 stores a measurement configuration for measuring channel quality of the target cell according to the handover execution condition information, and stores a trigger event, a trigger condition, or the like applied to the target cell. As another example, when the UE configuration information included in the handover execution condition information is stored and a handover to the target base station is determined, the controller 810 controls the UE rapidly to attempt access to the target base station without separately receiving a configuration of the target base station.

Meanwhile, as described above, when the handover execution condition information includes a timer for indicating a validity period (or restricting the applying of the validity period) of the handover command information or the handover execution condition information, the controller 810 verifies whether the timer expires. When the timer expires, the controller 810 may release the stored target cell configuration.

When a trigger condition included in the handover execution condition information is met, the controller 810 may determine handover execution to the target base station controlling the corresponding target cell. As an alternative, the controller 810 may not report a measurement result for the target base station to the source base station when the handover execution is determined. That is, when the UE based handover is configured, the controller 810 may control a measurement result meeting a handover execution condition not to be transmitted to the source base station. As an alternative, when the UE based handover is configured, the controller 810 may control measurement reporting not to be transmitted to the source base station until the timer of the validity period expires.

When handover execution is triggered to the target base station, the controller 810 may perform a random access procedure and access the target base station using the UE configuration information described above. To do this, the transmitter 820 may transmit signals and data needed for accessing the target base station.

In addition, the controller 810 controls the overall operation of the UE 800 needed for performing embodiments described above. Further, the transmitter 820 and the receiver 830 may transmit or receive signals, messages, data required to perform embodiments described above to or from the source base station and the target base station.

Figure 9:
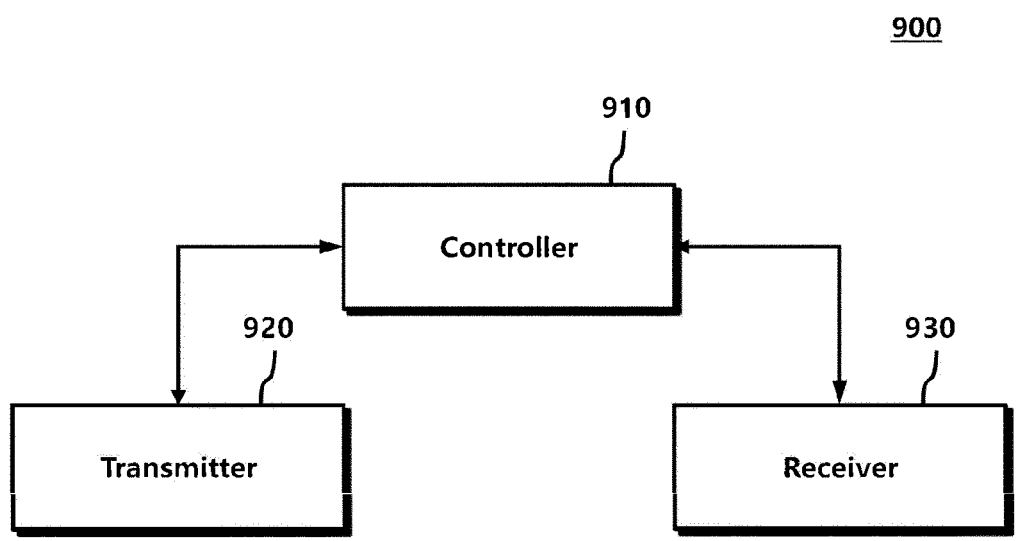
FIG. 9 is a block diagram illustrating a configuration of the source base station according to at least one embodiment of the present disclosure.

FIG. 9 is a block diagram illustrating a source base station according to at least one embodiment of the present disclosure.

Referring to FIG. 9, the source base station 900 controlling a UE based handover procedure may include a controller 910 configured to generate handover execution condition information for performing a UE based handover command, and a transmitter 920 configured to transmit high layer signaling including UE based handover command information and handover execution condition information to a UE.

When the handover execution condition information is changed, the transmitter 920 may transmit, to the UE, second high layer signaling including changed handover execution condition information and UE based handover command information.

For example, the handover execution condition information may be configured by the source base station or be configured by the source base station after the source base station has received information from a target base station. As an alternative, the source base station receives information to be included in the handover execution condition information from a target base station and then generates the handover execution condition information to be transmitted to the UE.

The controller 910 may configure the handover execution condition information or the handover command information for each of a plurality of target base stations or a plurality of target cells.

The transmitter 920 may transmit execution condition information including handover command information and condition information for executing the handover command to the UE having an RRC connection with the source base station. For example, the handover execution condition information and the handover command information may be transmitted to the UE by being included in an RRC connection reconfiguration message. Further, the high layer signaling may include a plurality of handover execution condition information or handover command information, each of which may be included in a container for each identifier or for each target cell or target base station.

As described above, the UE may verify the high layer signaling received from the source base station and store a target cell configuration using the handover execution condition information. When a timer indicating the validity period is included in the handover execution condition information, the UE may release the target cell configuration when the timer which restricts the applying of the handover execution condition information expires.

Further, the controller 910 may change to a network based handover, such as the LTE handover procedure, after the UE based handover command has been transmitted. As an alternative, the controller 910 may change a target base station after a command of the UE based handover to a specific target base station has been transmitted. In this case, the transmitter 920 transmits second high layer signaling including changed handover execution condition information and handover command information to the UE When the second high layer signaling is received, the UE may replace the earlier stored target cell configuration with a second target cell configuration using the handover command information and the handover execution condition information in the second high layer signaling.

In addition, the controller 910 controls the overall operation of the source base station 900 needed for performing embodiments described above. Further, the transmitter 920 and the receiver 930 may transmit or receive signals, messages, data required to perform embodiments described above to or from the UE and the target base station.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

The forgoing has been presented to best explain the embodiments and examples and thereby to enable any person skilled in the art to make and use the invention as claimed. Various modifications, additions and substitutions to the described embodiments and examples will be readily apparent to those skilled in the art without departing from the spirit and scope of the present disclosure. Therefore, exemplary aspects of the present disclosure have not been described for limiting purposes, but to describe the embodiments, the therefore, the scope of the present disclosure shall not be limited to such embodiments. The scope of the present disclosure shall be construed on the basis of the accompanying claims in such a manner that all of the technical ideas included within the scope equivalent to the claims belong to the present disclosure.

What is claimed is:

1. A method of a user equipment (UE) for performing a UE based handover, the method comprising:
   receiving, by the UE, a radio resource control (RRC) message including a UE based handover configuration and a configuration for a target cell, from a source base station that generates the UE based handover configuration, the RRC message also including a reporting condition or event used for handover execution indicating a duration after which reporting is to be performed;
   determining whether or not to perform the UE based handover based on the UE based handover configuration received from the source base station; and
   performing, based on the determination, the UE based handover towards the target cell using the configuration for the target cell when the reporting condition or event used for handover execution is satisfied but the duration has not passed,
   wherein the UE, in response to a determination that the UE based handover is not yet to be performed, prohibits or suppresses triggering a measurement reporting relative to reference signal received quality (RSRQ), prohibits or suppresses initiating the RSRQ measurement reporting, and prohibits or suppresses transferring the RSRQ measurement reporting,
   wherein the UE, in response to the determination that the UE based handover is not yet to be performed, prohibits or suppresses triggering a measurement reporting relative to reference signal received power (RSRP), prohibits or suppresses initiating the RSRP measurement reporting, and prohibits or suppresses transferring the RSRP measurement reporting, and
   wherein the UE, in response to the determination that the UE based handover is not yet to be performed, prohibits or suppresses triggering a measurement reporting relative to reference signal signal-to-interference plus noise ratio (RS-SINR), prohibits or suppresses initiating the RS-SINR measurement reporting, and prohibits or suppresses transferring the RS-SINR measurement reporting.

2. The method according to claim 1, further comprising:
performing a measurement operation for an event for determining handover execution; and
transmitting a measurement report to the base station, the measurement report related to a received reference signal and based on the measurement operation.

3. The method according to claim 2,
wherein the event for determining handover execution includes a specific event group,
wherein the determining whether or not to perform the UE based handover is applied for the specific event group, and
wherein the measurement report is applied for the specific event group.

4. The method according to claim 3, wherein the handover execution includes one or more of initiating random access, performing synchronization, applying UE configuration information, and transmitting a handover complete message to the target cell.

5. The method according to claim 1, further comprising:
releasing, after performing the UE based handover towards the target cell, the configuration for the target cell.

6. The method according to claim 1, wherein the UE based handover configuration of the RRC message includes a measurement identifier identifying at least one of a measurement reporting operation relating to reference signal received quality (RSRQ), a measurement reporting operation relating to reference signal received power (RSRP), and the measurement reporting operation relating to reference signal signal-to-interference plus noise ratio (RS-SINR).

7. The method according to claim 1,
wherein the UE based handover configuration is configured separately for another target cell, and
wherein the UE based handover configuration is configured separately for another target base station.

8. The method according to claim 1, wherein, based on the received RRC message, no measurement reporting operations related to at least one of reference signal received quality (RSRQ), reference signal received power (RSRP), and reference signal signal-to-interference plus noise ratio (RS-SINR) are performed for the UE based handover.

9. The method according to claim 8,
wherein the operations related to RSRQ measurement reporting include triggering the RSRQ measurement reporting, transferring the RSRQ measurement reporting, and initiating the RSRQ measurement reporting,
wherein the operations related to RSRP measurement reporting include triggering the RSRP measurement reporting, transferring the RSRP measurement reporting, and initiating the RSRP measurement reporting, and
wherein the operations related to RS-SINR measurement reporting include triggering the RS-SINR measurement reporting, transferring the RS-SINR measurement reporting, and initiating the RS-SINR measurement reporting.

10. The method according to claim 1, further comprising:
performing a measurement operation for an event for determining handover execution,
wherein the RRC message further includes a timer value of a timer, the timer value indicating a validity period for the UE based handover.

11. The method according to claim 10,
wherein the measurement operation determines that a reporting condition for handover execution is satisfied, and
wherein the determination that the UE based handover is not to be performed includes a determination that the timer is running and the validity period has not expired.

12. The method according to claim 10, wherein the timer value indicates a maximum waiting time for restricting the handover execution.

13. The method according to claim 10,
wherein, based on the received RRC message, no measurement reporting operations related to reference signal received quality (RSRQ), reference signal received power (RSRP), and reference signal signal-to-interference plus noise ratio (RS-SINR) are performed for the UE based handover,
wherein the operations related to RSRQ measurement reporting include triggering the RSRQ measurement reporting, transferring the RSRQ measurement reporting, and initiating the RSRQ measurement reporting,
wherein the operations related to RSRP measurement reporting include triggering the RSRP measurement reporting, transferring the RSRP measurement reporting, and initiating the RSRP measurement reporting, and
wherein the operations related to RS-SINR measurement reporting include triggering the RS-SINR measurement reporting, transferring the RS-SINR measurement reporting, and initiating the RS-SINR measurement reporting.

14. A method of a source base station for performing a user equipment (UE) based handover, the method comprising:
generating, by the source base station, a UE based handover configuration;
configuring, by the source base station, the UE based handover configuration and a configuration for a target cell in a radio resource control (RRC) message for performing the UE based handover, the configured RRC message including handover execution condition information indicating whether or not to perform the UE based handover;
transmitting, from the source base station to a UE, the configured RRC message, the RRC message also including a reporting condition or event used for handover execution indicating a duration after which reporting is to be performed,
the RRC message to be used by the UE to determine whether or not to perform the UE based handover based on the UE based handover configuration transmitted from the source base station and
perform, based on the determination, the UE based handover towards the target cell using the configuration for the target cell when the reporting condition or event used for handover execution is satisfied but the duration has not passed;
releasing, after the UE based handover towards the target cell, the configuration for the target cell,
wherein the UE, in response to a determination that the UE based handover is not yet to be performed, prohibits or suppresses triggering a measurement reporting relative to reference signal received quality (RSRQ), prohibits or suppresses initiating the RSRQ measurement reporting, and prohibits or suppresses transferring the RSRQ measurement reporting, wherein the UE, in response to the determination that the UE based handover is not yet to be performed, prohibits or suppresses triggering a measurement reporting relative to reference signal received power (RSRP), prohibits or suppresses initiating the RSRP measurement reporting, and prohibits or suppresses transferring the RSRP measurement reporting, and wherein the UE, in response to the determination that the UE based handover is not yet to be performed, prohibits or suppresses triggering a measurement reporting relative to reference signal signal-to-interference plus noise ratio (RS-SINR), prohibits or suppresses initiating the RS-SINR measurement reporting, and prohibits or suppresses transferring the RS-SINR measurement reporting.

15. The method according to claim 14, wherein the UE based handover configuration is associated with a measurement identifier identifying a measurement configuration applied for measurement reporting relating to reference signal received quality (RSRQ), measurement reporting relating to reference signal received power (RSRP), and measurement reporting relating to reference signal signal-to-interference plus noise ratio (RS-SINR).

16. The method according to claim 14, further comprising:
configuring a UE based handover configuration separately for another target cell, and
configuring a UE based handover configuration separately for another target base station.

17. A user equipment (UE) for performing a UE based handover, the UE comprising:
a receiver configured to receive a radio resource control (RRC) message including a UE based handover configuration and a configuration for a target cell, from a source base station that generates the UE based handover configuration, the RRC message also including a reporting condition or event used for handover execution indicating a duration after which reporting is to be performed; and
a controller configured to
determine whether or not to perform the UE based handover based on the UE based handover configuration received from the source base station,
perform the UE based handover towards the target cell using the configuration for the target cell based on the determination, when the reporting condition or event used for handover execution is satisfied but the duration has not passed, and
release, after the UE based handover is performed, the configuration for the target cell, wherein the UE, in response to a determination that the UE based handover is not yet to be performed, prohibits or suppresses triggering a measurement reporting relative to reference signal received quality (RSRQ), prohibits or suppresses initiating the RSRQ measurement reporting, and prohibits or suppresses transferring the RSRQ measurement reporting, wherein the UE, in response to the determination that the UE based handover is not yet to be performed, prohibits or suppresses triggering a measurement reporting relative to reference signal received power (RSRP), prohibits or suppresses initiating the RSRP measurement reporting, and prohibits or suppresses transferring the RSRP measurement reporting, and wherein the UE, in response to the determination that the UE based handover is not yet to be performed, prohibits or suppresses triggering a measurement reporting relative to reference signal signal-to-interference plus noise ratio (RS-SINR), prohibits or suppresses initiating the RS-SINR measurement reporting, and prohibits or suppresses transferring the RS-SINR measurement reporting.

18. The UE according to claim 17, wherein the UE based handover configuration of the RRC message includes a measurement identifier identifying a measurement reporting operation relating to reference signal received quality (RSRQ), a measurement reporting operation relating to reference signal received power (RSRP), and the measurement reporting operation relating to reference signal signal-to-interference plus noise ratio (RS-SINR).

19. The UE according to claim 17,
wherein the UE based handover configuration is configured separately for another target cell, and
wherein the UE based handover configuration is configured separately for another target base station.

* * * * *